United States Patent
Matsumoto et al.

(10) Patent No.: US 9,118,874 B2
(45) Date of Patent: Aug. 25, 2015

(54) IMAGE CAPTURING DEVICE, COLOR MEASURING DEVICE, COLOR MEASURING SYSTEM, IMAGE FORMING APPARATUS, AND COLOR MEASURING METHOD

(71) Applicants: Hiroshi Matsumoto, Saitama (JP);
Nobuyuki Satoh, Kanagawa (JP);
Yasuyuki Suzuki, Kanagawa (JP);
Mamoru Yorimoto, Kanagawa (JP);
Masato Kobayashi, Kanagawa (JP);
Yuichi Sakurada, Tokyo (JP); Suguru Yokozawa, Kanagawa (JP); Tatsuhiko Okada, Saitama (JP); Tomokazu Kanzawa, Saitama (JP); Daisaku Horikawa, Saitama (JP)

(72) Inventors: Hiroshi Matsumoto, Saitama (JP);
Nobuyuki Satoh, Kanagawa (JP);
Yasuyuki Suzuki, Kanagawa (JP);
Mamoru Yorimoto, Kanagawa (JP);
Masato Kobayashi, Kanagawa (JP);
Yuichi Sakurada, Tokyo (JP); Suguru Yokozawa, Kanagawa (JP); Tatsuhiko Okada, Saitama (JP); Tomokazu Kanzawa, Saitama (JP); Daisaku Horikawa, Saitama (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 13/800,001

(22) Filed: Mar. 13, 2013

(65) Prior Publication Data
US 2013/0242361 A1    Sep. 19, 2013

(30) Foreign Application Priority Data
Mar. 13, 2012    (JP) .................. 2012-056546

(51) Int. Cl.
| | | |
|---|---|---|
| G06F 3/12 | (2006.01) |
| G06K 15/12 | (2006.01) |
| H04N 1/40 | (2006.01) |
| G06T 5/00 | (2006.01) |
| H04N 1/60 | (2006.01) |
| G01J 3/02 | (2006.01) |
| G01J 3/46 | (2006.01) |
| G01J 3/52 | (2006.01) |

(52) U.S. Cl.
CPC ............ *H04N 1/6033* (2013.01); *G01J 3/0208* (2013.01); *G01J 3/0262* (2013.01); *G01J 3/0291* (2013.01); *G01J 3/0297* (2013.01); *G01J 3/462* (2013.01); *G01J 3/52* (2013.01); *G01J 3/524* (2013.01); *H04N 1/6044* (2013.01)

(58) Field of Classification Search
USPC .......................................... 358/471, 474, 504
See application file for complete search history.

(56) References Cited

U.S. PATENT DOCUMENTS 5,847,884 A * 12/1998 Kamon et al. ................ 359/806
6,424,433 B1 * 7/2002 Miyauchi et al. ............ 358/471

(Continued)

FOREIGN PATENT DOCUMENTS

| JP | 5-223642 | 8/1993 |
| JP | 2003-255774 | 9/2003 |
| JP | 3848882 | 9/2006 |

OTHER PUBLICATIONS

U.S. Appl. No. 13/835,823, filed Mar. 15, 2013, Suzuki, et al.

(Continued)

*Primary Examiner* — Akwasi M Sarpong
(74) *Attorney, Agent, or Firm* — Oblon, McClelland, Maier & Neustadt, L.L.P.

(57) ABSTRACT

An image capturing device includes a sensor unit that captures a predetermined range including a subject; a reference chart that is captured by the sensor unit together with the subject; an illumination light source that illuminates the subject and the reference chart; a lens member including one or more lenses arranged in an optical path of reflected light extending from the subject and the reference chart to the sensor unit; and a lens moving unit that moves at least one lens of the lens member so as to change a position thereof in a direction along the optical path.

11 Claims, 25 Drawing Sheets

(56) References Cited

U.S. PATENT DOCUMENTS

| | | |
|---|---|---|
| 2003/0150719 A1 | 8/2003 | Sawa |
| 2005/0213124 A1* | 9/2005 | Takeshita et al. ............... 358/1.9 |
| 2007/0064141 A1* | 3/2007 | Misawa et al. ........... 348/333.01 |
| 2007/0268357 A1* | 11/2007 | Nagata et al. .................. 347/243 |
| 2012/0069411 A1* | 3/2012 | Satoh et al. ................... 358/504 |
| 2013/0027720 A1 | 1/2013 | Satoh |
| 2013/0027721 A1 | 1/2013 | Kobayashi et al. |

OTHER PUBLICATIONS

U.S. Appl. No. 13/838,262, filed Mar. 15, 2013, Suzuki, et al.
U.S. Appl. No. 13/845,964, filed Mar. 18, 2013, Okada, et al.

* cited by examiner

MEMORY TABLE Tb1

INITIAL REFERENCE RGB VALUE RdGdBd (125)

| PATCH NUMBER | Rd | Gd | Bd | Ld | ad | bd | xd | yd | zd |
|---|---|---|---|---|---|---|---|---|---|
| 1 | 3 | 8 | 5 | 6 | 7 | 2 | | | |
| 2 | | | | | | | | | |
| 3 | | | | | | | | | |
| ... | | | | | | | | | |
| ... | | | | | | | | | |
| | | | | | | | | | |
| ... | | | | | | | | | |
| 72 | | | | | | | | | |

IMAGE CAPTURING DEVICE, COLOR MEASURING DEVICE, COLOR MEASURING SYSTEM, IMAGE FORMING APPARATUS, AND COLOR MEASURING METHOD

CROSS-REFERENCE TO RELATED APPLICATIONS

The present application claims priority to and incorporates by reference the entire contents of Japanese Patent Application No. 2012-056546 filed in Japan on Mar. 13, 2012.

BACKGROUND OF THE INVENTION

1. Field of the Invention

The present invention relates to an image capturing device, a color measuring device, a color measuring system, an image forming apparatus, and a color measuring method, and in particular to an image capturing device, an image capturing system, a color measuring device, a color measuring system, and an image forming apparatus that stably capture a subject and a reference chart.

2. Description of the Related Art

Along with the improvement in image quality, image forming apparatuses, such as color ink-jet image forming apparatuses and color electrophotography image forming apparatuses, are used for offset printing of an advertising medium, a brochure, and other mediums that are printed in a relatively small number of sets but require high image quality.

In offset printing desired to achieve high image quality, colors of printed materials desired by a customer may possibly be different from colors of printout results actually printed out by an image forming apparatus.

Typically, a customer checks the colors of a printed material on a display to order printing. Image forming apparatuses, however, have color reproduction characteristics unique to each model and may possibly produce printing results different from the colors checked on the display.

To address this, conventionally used is a technology for reproducing colors by using a L*a*b* color space and an xyz color space, that is, a color space independent of a device, such as a display and an image forming apparatus, for example.

Image forming apparatuses control the amount of color materials and other factors to output specified colors. Ink-jet image forming apparatuses, for example, perform arithmetic control on the amount of ejected ink and a print pattern to control the amount of ink ejected from an ink head, thereby controlling output colors.

Electrophotography image forming apparatuses, for example, control the amount of toner adhering to a photosensitive element and the light intensity of a laser beam, thereby controlling output colors.

However, the amount of color materials, that is, the amount of ejected ink in an ink-jet image forming apparatus, for example, fluctuates depending on the state of a head nozzle, fluctuation in viscosity of the ink, and fluctuation in an ejection drive element (e.g., a piezoelectric element). As a result, fluctuation occurs in color reproducibility. Furthermore, the amount of ejected ink in ink-jet image forming apparatuses changes over time in one image forming apparatus or varies among image forming apparatuses. As a result, fluctuation occurs in color reproduction of an image over time or among image forming apparatuses.

To address this, image forming apparatuses conventionally perform color adjustment to suppress output fluctuation caused by characteristics unique to each device and to improve output reproducibility corresponding to input. The color adjustment is performed as follows. An image forming apparatus actually outputs an image of a color patch in a reference color (a reference color-patch image), and a color measuring device performs color measurement on the reference color-patch image. Subsequently, a color conversion parameter is generated based on difference between the colorimetric value of the reference color-patch image measured by the color measuring device and the color specification value of a reference color corresponding thereto in a standard color space. The color conversion parameter is then set to the image forming apparatus. To output an image corresponding to input image data, the image forming apparatus performs color conversion on the input image data based on the color conversion parameter thus set and records and outputs an image based on the image data on which the color conversion is performed. Thus, the image forming apparatus suppresses output fluctuation caused by characteristics unique to each device and outputs an image with high color reproducibility.

In the conventional color adjustment, spectrophotometers are widely used as the color measuring device that measures the reference color-patch image. Because spectrophotometers can obtain spectral reflectivity in each wavelength, they can perform highly accurate color measurement. Spectrophotometers, however, are expensive devices equipped with a number of sensors. Thus, it is required to perform highly accurate color measurement with a cheaper device.

Japanese Patent Application Laid-open No. 5-223642 discloses a color measuring device including a reference color measuring unit, a color image input unit, an image extracting unit, and an arithmetic unit. The reference color measuring unit performs color measurement on a reference color chart in advance so as to acquire a color reference value in an RGB data format. The color image input unit acquires RGB data by capturing a subject including the reference color chart and an object on which color measurement is to be performed simultaneously or separately. The image extracting unit extracts RGB data of the reference color chart and RGB data of the object on which color measurement is to be performed from the RGB data acquired by the color image input unit. The arithmetic unit calculates difference between the RGB data of the reference color chart acquired by the image extracting unit and the RGB data of the reference color chart acquired by the reference color measuring unit and corrects at least the RGB data of the object on which color measurement is to be performed using the difference. In the conventional technology, the reference color chart serving as a target for comparison with the subject is placed near the subject to be a target for color measurement. A color video camera serving as the color image input unit then captures the subject and the reference color chart simultaneously. Subsequently, the color measuring device corrects the RGB data of the subject using the RGB data of the reference color chart acquired by the image capturing to transform the RGB data of the subject into a color specification value in a standard color space.

In the conventional technology disclosed in Japanese Patent Application Laid-open No. 5-223642, however, it is difficult to keep the positional relationship constant between the reference color chart to be captured as the target for comparison with the subject and the color image input unit in each image capturing. As a result, the image capturing conditions vary in each image capturing, thereby making it difficult to perform stable image capturing.

Therefore, there is a need for an image capturing device, a color measuring device, a color measuring system, an image forming apparatus, and a color measuring method that are capable of capturing a subject and a reference chart in a stable positional relationship.

SUMMARY OF THE INVENTION

According to an embodiment, there is provided an image capturing device that includes a sensor unit that captures a predetermined range including a subject; a reference chart that is captured by the sensor unit together with the subject; an illumination light source that illuminates the subject and the reference chart; a lens member including one or more lenses arranged in an optical path of reflected light extending from the subject and the reference chart to the sensor unit; and a lens moving unit that moves at least one lens of the lens member so as to change a position thereof in a direction along the optical path.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are described below in greater detail with reference to the accompanying drawings. Because the embodiments below are exemplary embodiments according to the present invention, various types of technically preferable restrictions are put thereon. The scope of the present invention, however, is not disadvantageously restricted by the description below. Furthermore, not all the components described in the present embodiment are components essential to the present invention.

First Embodiment

Figure 1:
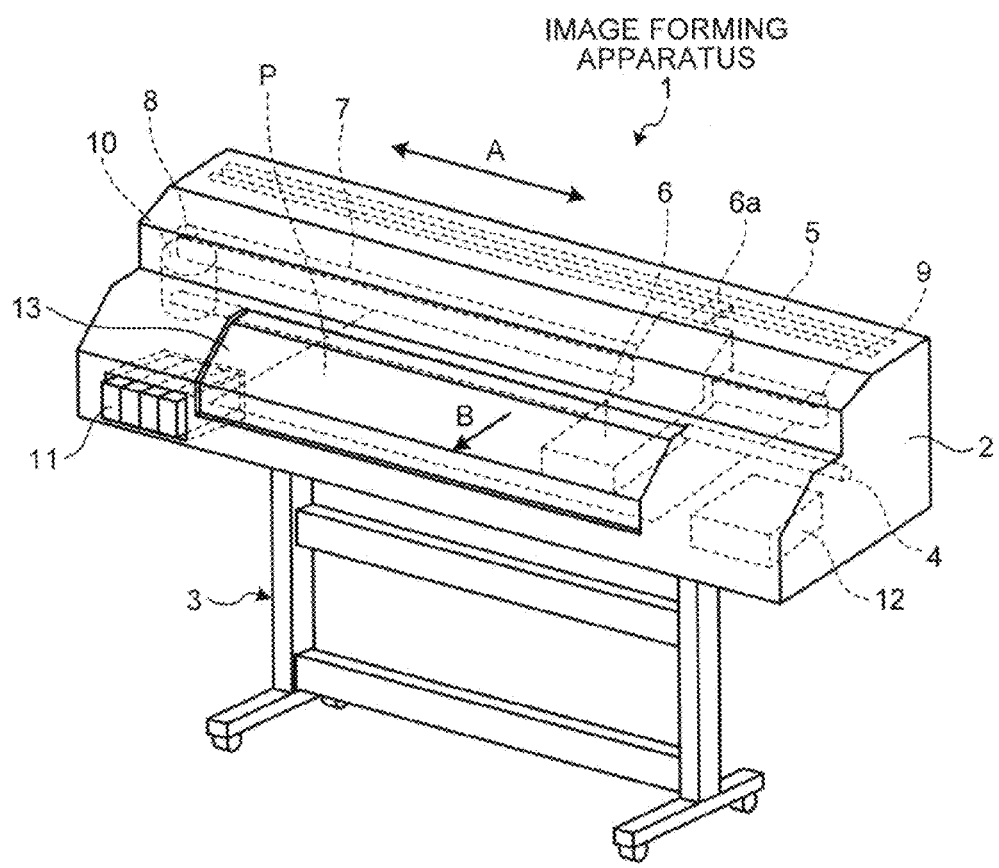
FIG. 1 is a schematic perspective view of an image forming apparatus according to an embodiment of the present invention.

FIG. 1 to FIG. 27 are schematics of an embodiment of an image capturing device, an image capturing system, a color measuring device, a color measuring system, and an image forming apparatus of the present invention. FIG. 1 is a schematic perspective view of an image forming apparatus 1 according to the embodiment of the image capturing device, the image capturing system, the color measuring device, the color measuring system, and the image forming apparatus of the present invention.

In FIG. 1, the image forming apparatus 1 includes a main housing 2 arranged on a main frame 3. The main housing 2 houses a main guide rod 4 and a sub guide rod 5 extending in a main-scanning direction indicated by a double-headed arrow A in FIG. 1. The main guide rod 4 supports a carriage 6 in a movable manner. The carriage 6 is provided with a connecting piece 6a that engages with the sub guide rod 5 to stabilize the posture of the carriage 6.

The image forming apparatus 1 includes a timing belt 7 in an endless-belt shape arranged along the main guide rod 4. The timing belt 7 is stretched around a driving pulley 8 and a driven pulley 9. The driving pulley 8 is driven to rotate by a main-scanning motor 10, and the driven pulley 9 is arranged so as to apply predetermined tension to the timing belt 7. The driving pulley 8 is driven to rotate by the main-scanning motor 10, whereby the timing belt 7 is moved to rotate in the main-scanning direction depending on the rotation direction.

The carriage 6 is connected to the timing belt 7. The timing belt 7 is moved to rotate in the main-scanning direction by the driving pulley 8, whereby the carriage 6 reciprocates in the main-scanning direction along the main guide rod 4.

The image forming apparatus 1 includes a cartridge unit 11 and a maintenance mechanism 12 at positions at both ends in the main-scanning direction in the main housing 2. The cartridge unit 11 houses cartridges containing ink in each color of yellow (Y), magenta (M), cyan (C), and black (K) in a replaceable manner. The cartridges in the cartridge unit 11 are connected to respective print heads 20*y*, 20*m*, 20*c*, and 20*k* (refer to FIG. 2) of corresponding color in a print head 20 mounted on the carriage 6 with pipes, which are not illustrated, and supply the ink to the respective print heads 20*y*, 20*m*, 20*c*, and 20*k* through the pipes. In the description below, the print heads 20*y*, 20*m*, 20*c*, and 20*k* may be collectively referred to as the print head 20.

As will be described later, the image forming apparatus 1 ejects ink onto a recording medium P intermittently conveyed in a sub-scanning direction (a direction of an arrow B in FIG. 1) orthogonal to the main-scanning direction on a platen 14 (refer to FIG. 2) while moving the carriage 6 in the main-scanning direction. Thus, the image forming apparatus 1 records and outputs an image on the recording medium P.

In other words, the image forming apparatus 1 according to the present embodiment intermittently conveys the recording medium P in the sub-scanning direction and moves the carriage 6 in the main-scanning direction while conveyance of the recording medium P in the sub-scanning direction is being stopped. During this operation, the image forming apparatus 1 ejects ink onto the recording medium P placed on the platen 14 from nozzle arrays of the print head 20 mounted on the carriage 6, thereby forming an image on the recording medium P.

The maintenance mechanism 12 cleans an ejection surface of the print head 20, caps the print head 20, and ejects waste ink, for example, to discharge the waste ink from the print head 20 and maintain the reliability of the print head 20.

The image forming apparatus 1 is provided with a cover 13 that can expose or cover a conveyed portion of the recording medium P. Thus, while maintenance is being done or a jam is occurring in the image forming apparatus 1, opening the cover 13 enables a maintenance operation in the main housing 2 and removal of the recording medium P causing the jam, for example.

Figure 2:
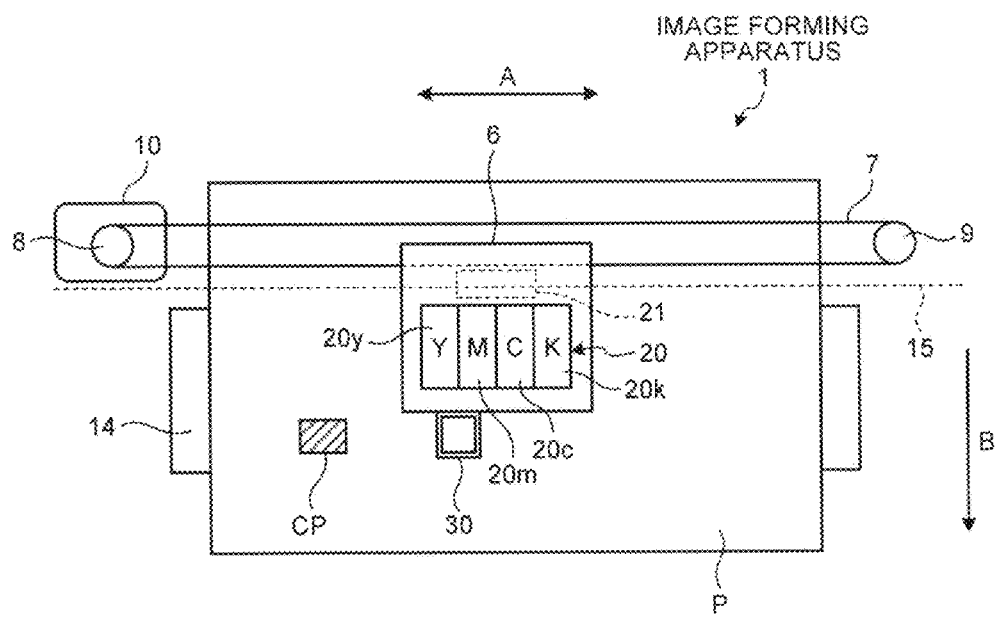
FIG. 2 is a plane view of a carriage.

As illustrated in FIG. 2, the carriage 6 is equipped with the print heads 20*y*, 20*m*, 20*c*, and 20*k*. The print heads 20*y*, 20*m*, 20*c*, and 20*k* are connected to the respective cartridges of corresponding color in the cartridge unit 11 with the pipes and eject the ink of corresponding color onto the recording medium P facing thereto. In other words, the print head 20*y* ejects yellow (Y) ink, the print head 20*m* ejects magenta (M) ink, the print head 20*c* ejects cyan (C) ink, and the print head 20*k* ejects black (K) ink.

The print head 20 is mounted on the carriage 6 such that the ejection surface (nozzle surface) faces downward (toward the recording medium P) in FIG. 1 and ejects the ink onto the recording medium P.

The image forming apparatus 1 includes an encoder sheet 15 arranged at least over a moving range of the carriage 6 in a manner parallel to the timing belt 7, that is, to the main guide rod 4. The carriage 6 is provided with an encoder sensor 21 that reads the encoder sheet 15. The image forming apparatus 1 controls drive of the main-scanning motor 10 based on the results of reading of the encoder sheet 15 performed by the encoder sensor 21, thereby controlling movement of the carriage 6 in the main-scanning direction.

Figure 3:
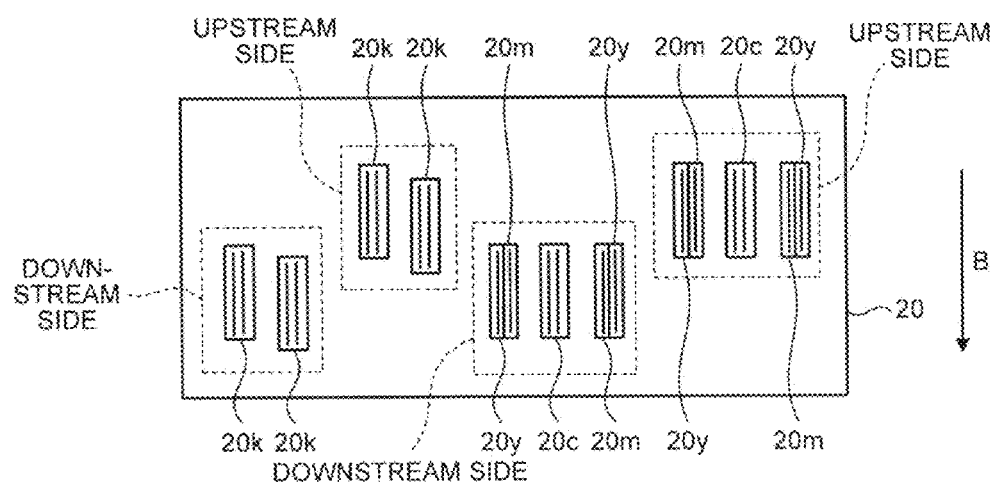
FIG. 3 is a schematic of arrangement of print heads.

In the print head 20 mounted on the carriage 6, the print heads 20*y*, 20*m*, 20*c*, and 20*k* are each formed of a plurality of nozzle arrays as illustrated in FIG. 3. The print head 20 ejects the ink onto the recording medium P conveyed on the platen 14 from the nozzle arrays, thereby forming an image on the recording medium P. To make the width of an image capable of being formed on the recording medium P in one scanning of the carriage 6 larger, the carriage 6 is equipped with the print head 20 on the upstream side and the print head 20 on the downstream side in the image forming apparatus 1. Furthermore, to increase printing speed of black, the print heads 20*k* that eject black ink are mounted on the carriage 6 twice as many as the print heads 20*y*, 20*m*, and 20*c* that eject color ink. The print heads 20*y* and 6*m* are arranged in a manner separated in the main-scanning direction and adjacent to each other such that the colors may not be changed between in the forward movement and in the backward movement by maintaining the order of the colors stacked in the reciprocating movement of the carriage 6. The arrangement of the print heads 20*y*, 20*m*, 20*c*, and 20*k* of the print head 20 is not limited to the arrangement illustrated in FIG. 3.

As illustrated in FIG. 2, the carriage 6 is equipped with an image capturing unit (an image capturing device) 30. The image capturing unit 30 captures a subject (a target for color measurement) to perform color measurement on the subject in color adjustment, which will be described later.

Figure 4:
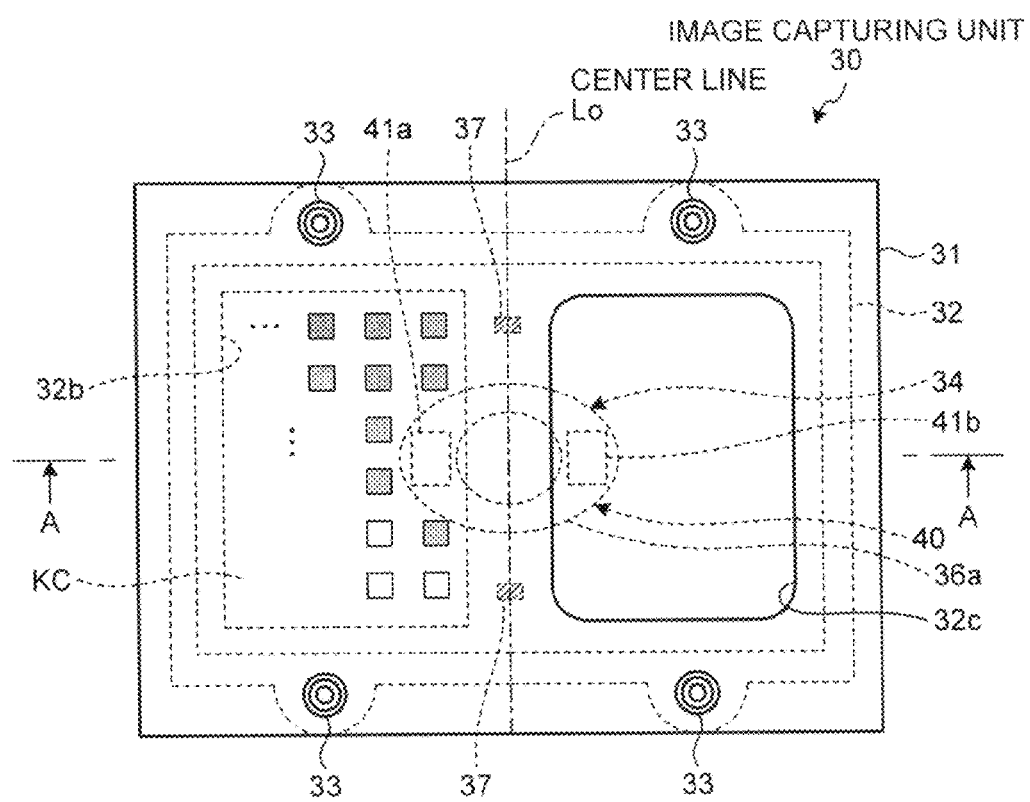
FIG. 4 is a plane view of an image capturing unit.
Figure 5:
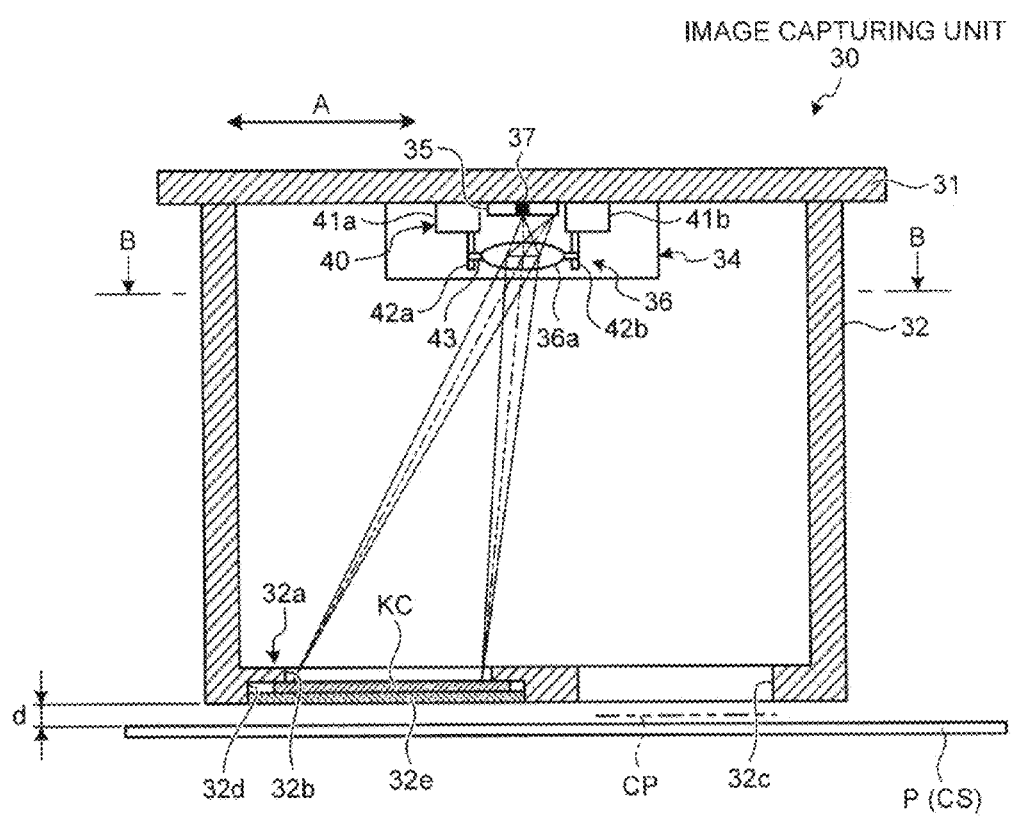
FIG. 5 is a sectional view of the image capturing unit viewed in a direction of arrow A-A in FIG. 4.
Figure 6:
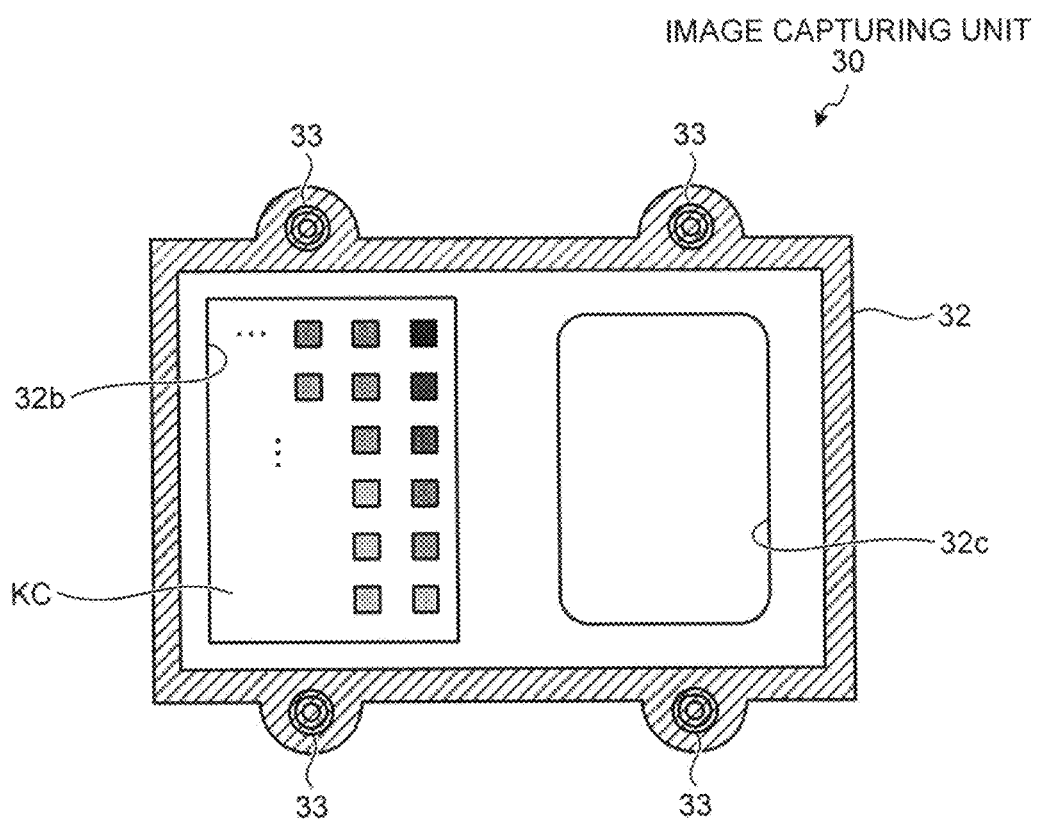
FIG. 6 is a sectional view of the image capturing unit viewed in a direction of arrow B-B in FIG. 5.

In the image capturing unit (image capturing device) 30, a square box-shaped frame body 32 opening on a surface facing a board 31 is fixed to the board 31 with fastening members 33 as illustrated in a plane view of FIG. 4, a sectional view of FIG. 5 viewed in a direction of arrow A-A in FIG. 4, and a sectional view of FIG. 6 viewed in a direction of arrow B-B in FIG. 5. The board 31 is fixed to the carriage 6 illustrated in FIG. 1.

The image capturing unit 30 is provided with an image sensor unit 34 at the center of a surface of the board 31 on the frame body 32 side. The image sensor unit 34 includes a two-dimensional image sensor (a sensor unit) 35, such as a charge coupled device (CCD) sensor and a complementary metal oxide semiconductor (CMOS) sensor, and a lens unit (a lens member) 36. The image sensor 35 captures a predetermined range including a subject.

The image capturing unit 30 is attached to the carriage 6 such that a lower surface of a surface 32*a* (hereinafter, referred to as a bottom surface) of the frame body 32 opposite to the board 31 side faces the recording medium P placed on the platen 14 with a predetermined gap d interposed therebetween. The bottom surface (facing surface) 32*a* has an opening 32*b* and an opening 32*c* in a nearly rectangular shape formed symmetrically in the main-scanning direction with respect to a center line Lo. The bottom surface 32*a*, specifically, the bottom surface 32*a* between the opening 32*b* and the opening 32*c* may be subjected to certain surface treatment for absorbing regular reflected light, for example.

The gap d is preferably small in consideration of the focal length of the two-dimensional image sensor 35 as will be described later. The gap d is set at a length of approximately 1 mm to 2 mm, for example, large enough to prevent the lower surface of the frame body 32 from coming into contact with the recording medium P in terms of the planarity of the recording medium P.

The shape of the frame body 32 is not limited to a square box-shape and may be a cylindrical box-shape or an elliptical cylindrical box-shape having the bottom surface 32*a* on which the openings 32*b* and 32*c* are formed, for example.

The opening 32*c* is used to capture reference color patches KP (refer to FIG. 11) on a reference sheet KS (refer to FIG. 11) and colorimetric adjustment color patches CP (refer to FIG. 14) on a colorimetric adjustment sheet CS (refer to FIG. 14) serving as a target to be captured (subject) formed on the recording medium P as will be described later. The opening 32*c* simply needs to be large enough to capture all the images to be captured. Specifically, the opening 32*c* is formed in a size slightly larger than the size of a captured area of the target to be captured in consideration of a shadow casted around the opening 32c because of the gap d between the frame body 32 and the target to be captured.

The opening 32b has a recess 32d with a predetermined width formed along the periphery of the opening 32b on the surface on the recording medium P side. A reference chart KC is set in the recess 32d in an attachable and detachable manner. A holding plate 32e is fit into and fixed to the recess 32d in the opening 32b of the frame body 32 in an attachable and detachable manner with a screw, for example. The holding plate 32e covers the surface of the reference chart KC on the recording medium P side and holds the reference chart KC in the recess 32d. Thus, the opening 32b is covered by the reference chart KC and the holding plate 32e. The surface of the holding plate 32e on the recording medium P side is a smooth flat surface.

The reference chart KC is captured simultaneously with the reference color patches KP or the colorimetric adjustment color patches CP by the image capturing unit 30. The reference chart KC is used as a target for comparison with image capturing colorimetric values of the reference color patches KP on the reference sheet KS and the colorimetric adjustment color patches CP on the colorimetric adjustment sheet CS serving as a target to be captured in color adjustment. In other words, the image capturing unit 30 captures the reference color patches KP on the reference sheet KS and the colorimetric adjustment color patches CP on the colorimetric adjustment sheet CS positioned outside of the frame body 32 through the opening 32c formed on the bottom surface 32a of the frame body 32. At this time, the image capturing unit 30 also captures color patches on the reference chart KC attached to the recess 32d formed along the periphery of the opening 32b on the bottom surface 32a of the frame body 32 as a target for comparison. Because the two-dimensional image sensor 35 sequentially scans pixels to read an image, the image capturing unit 30 does not technically read the reference chart KC simultaneously with the reference color patches KP on the reference sheet KS or the colorimetric adjustment patches CP on the colorimetric adjustment sheet CS. However, because the image capturing unit 30 can acquire images of the reference color patches KP or the colorimetric adjustment patches CP and an image of the reference chart KC in one frame, it is assumed that the image capturing unit 30 acquires the images simultaneously in the description below as appropriate.

Figure 7:
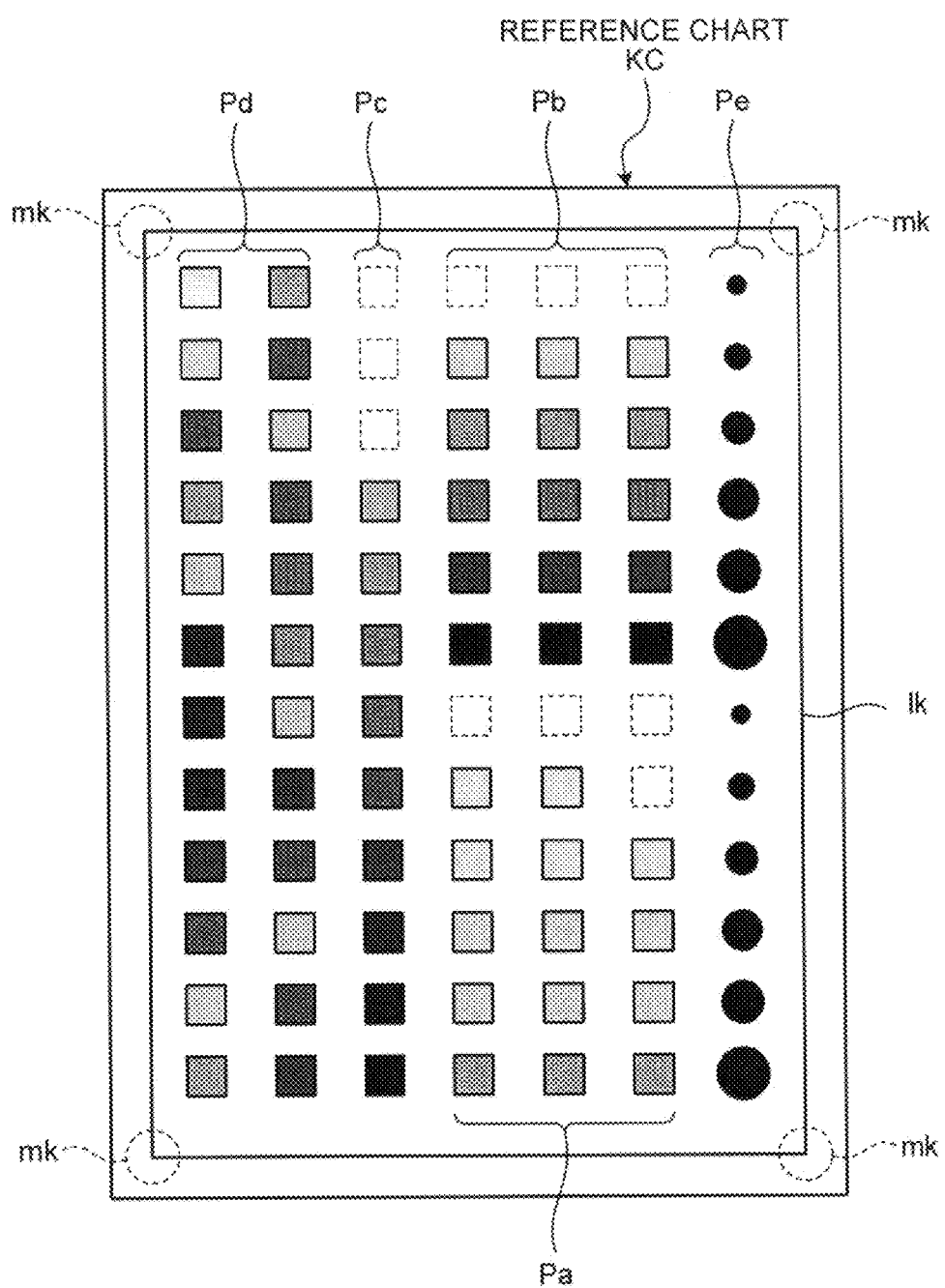
FIG. 7 is a plane view of a reference chart.

As illustrated in FIG. 7, the reference chart KC has a plurality of color measurement reference color patch arrays Pa to Pd, a dot-diameter measurement pattern array Pe, a distance measurement line lk, and a chart position specification marker mk formed on the surface (upper surface) facing the inside of the frame body 32 in the same manner as of the reference sheet KS, which will be described later.

The color measurement patch arrays Pa to Pd are composed of the patch array Pa in which color patches in primary colors of YMC are arranged in order of gradation, the patch array Pb in which color patches in secondary colors of RGB are arranged in order of gradation, the patch array (an achromatic gradation pattern) Pc in which gray-scale patches are arranged in order of gradation, and the patch array Pd in which patches in tertiary colors are arranged. The dot-diameter measurement pattern array Pe is a pattern array in which circular patterns different in size are arranged in order of size and is used for measurement of a geometric shape.

The distance measurement line lk is formed as a rectangular frame surrounding the color measurement patch arrays Pa to Pd and the dot-diameter measurement pattern array Pe. The chart position specification markers mk are provided to positions at four corners of the distance measurement line lk and are used to specify the position of each patch.

A color measurement control unit 106 (refer to FIG. 9 and FIG. 10), which will be described later, specifies the distance measurement line lk and the chart position specification markers mk positioned at the four corners thereof from image data of the reference chart KC acquired from the image capturing unit 30. Thus, the color measurement control unit 106 specifies the position of the reference chart KC and the position of each pattern.

The color specification values (Lab values) in a L*a*b* color space, which is a standard color space, of the patches constituting the color measurement reference color patch arrays Pa to Pd are measured in advance using a spectroscope BS (refer to FIG. 11) in the same manner as of the reference patches KP on the reference sheet KS, which will be described later. The color specification values are used as reference values when color measurement is performed on the colorimetric adjustment color patches CP on the colorimetric adjustment sheet CS, which will be described later.

The configuration of the color measurement patch arrays Pa to Pd arranged on the reference chart KC is not limited to the example of arrangement illustrated in FIG. 7, and any patch arrays may be used. Patches capable of specifying as wide a color range as possible may be used, for example. Alternatively, the patch array Pa of the primary colors of YMCK and the patch array Pc of the gray scale may be formed of patches of colorimetric values of the ink used in the image forming apparatus 1. Still alternatively, the patch array Pa of the secondary colors of RGB on the reference chart KC may be formed of patches of colorimetric values whose color can be developed with the ink used in the image forming apparatus 1. Still alternatively, a reference color chart that specifies colorimetric values, such as JapanColor, may be used.

The reference chart KC is arranged in the recess 32d formed along the outer periphery of the opening 32b formed on the bottom surface 32a of the frame body 32 on the surface on the recording medium P side. With this configuration, the two-dimensional image sensor 35 of the image sensor unit 34 can capture the reference chart KC at the focal length similar to that of the target to be captured, such as the recording medium P.

The reference chart KC is set in the recess 32d formed along the outer periphery of the opening 32b formed on the bottom surface 32a of the frame body 32 on the surface on the recording medium P side in an attachable and detachable manner. Furthermore, the surface of the reference chart KC on the recording medium P side is held in an attachable and detachable manner by the holding plate 32e attached to the recess 32d in an attachable and detachable manner. With this configuration, even if dust entering the frame body 32 adheres to the surface of the reference chart KC, for example, it is possible to detach the holding plate 32e and the reference chart KC, clean the reference chart KC, and reattach the holding plate 32e and the reference chart KC. As a result, the measurement accuracy of the reference chart KC can be improved.

As illustrated in FIG. 4 to FIG. 6, the image capturing unit 30 is provided with a pair of illumination light sources 37. The illumination light sources 37 are arranged at positions away from the center of the image sensor unit 34 by the same predetermined distance in the sub-scanning direction on the center line Lo passing through the center of the image sensor unit 34 and extending in the sub-scanning direction on the board 31. A light emitting diode (LED) is used as the illumination light sources 37, for example. The illumination light sources 37 are arranged on the center line Lo.

In the image capturing unit 30, the opening 32c for the captured area and the reference chart KC are arranged nearly symmetrically with respect to the center line Lo connecting the center of the lens unit 36 and the illumination light sources 37. With this configuration, the image capturing conditions of the two-dimensional image sensor 35 can be made identical linearly symmetrically. As a result, it is possible to improve the accuracy in color adjustment and color measurement performed by the two-dimensional image sensor 35 using the reference chart KC.

Figure 8:
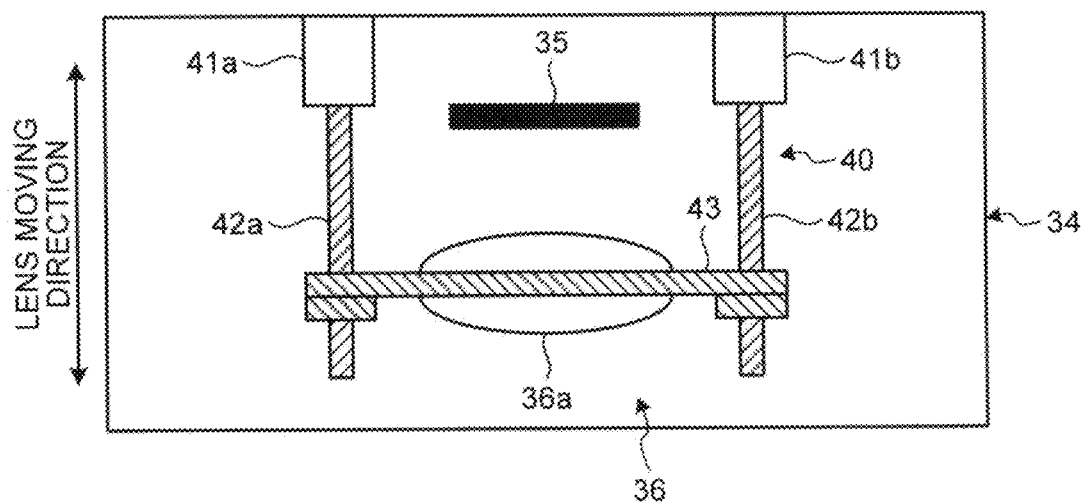
FIG. 8 is an enlarged front view of a main section of a lens unit.

The lens unit 36 is arranged in optical paths of reflected light extending from the subject and the reference chart KC to the two-dimensional image sensor 35 and concentrates the reflected light on the two-dimensional image sensor 35. While one imaging lens is used as a lens 36a in the lens unit 36 as illustrated in FIG. 8, a plurality of lenses may be used as will be described later. The lens unit 36 functions as a lens member. The lens 36a of the lens unit 36 is moved in directions closer to and away from the two-dimensional image sensor 35 in the vertical direction (a lens moving direction indicated by a double-headed arrow in FIG. 8) by a lens positioning mechanism (a lens moving unit) 40.

The lens positioning mechanism 40 includes driving motors (rotating units) 41a and 41b, guide rails 42a and 42b, and a lens holder (lens holding member) 43. The driving motors 41a and 41b are arranged in a manner sandwiching the lens 36a in the main-scanning direction. The guide rails 42a and 42b are driven to rotate by the driving motors 41a and 41b, respectively. The lens holder 43 extends between the guide rails 42a and 42b to hold the lens 36a. Rotation of the driving motors 41a and 41b is controlled by a lens positioning unit 50 (refer to FIG. 10).

The guide rails 42a and 42b extend in the vertical direction with respect to the two-dimensional image sensor 35 and are driven to rotate by the driving motors 41a and 41b, respectively. The guide rails 42a and 42b have a screw portion of a groove or a thread helically formed in the axial direction on the outer peripheral surface thereof.

The lens holder 43 has screw holes, which are not illustrated, into which the guide rails 42a and 42b are inserted on both ends. Screw portions formed of a thread or a groove in the screw holes engage with the screw portions of the guide rails 42a and 42b, thereby causing the lens holder 43 to move in the direction closer to or away from the two-dimensional image sensor 35 depending on the rotation direction of the guide rails 42a and 42b.

The driving motors 41a and 41b are driven to rotate in the same direction by a motor drive signal received from the lens positioning unit 50, which will be described later. As will be described later, if the driving motors 41a and 41b are pulse motors, the lens positioning unit 50 controls the number of pulses of the motor drive signal output to the driving motors 41a and 41b, thereby controlling the moving amount of the lens 36a. The lens positioning unit 50 changes codes of the motor drive signal output therefrom to the driving motors 41a and 41b between when the image capturing unit 30 captures the subject through the opening 32c and when the image capturing unit 30 captures the reference chart KC. Thus, the lens positioning unit 50 changes the rotation direction of the driving motors 41a and 41b, thereby changing the moving direction of the lens 36a.

Figure 9:
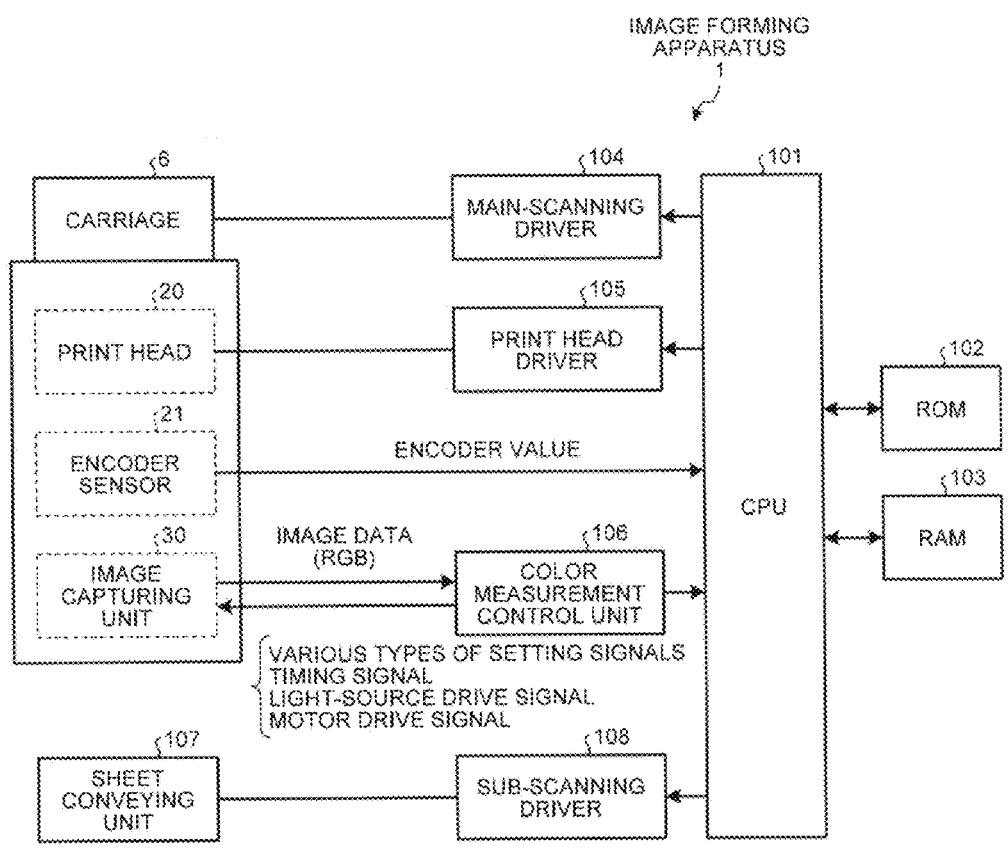
FIG. 9 is a block diagram of a configuration of a main section of the image forming apparatus.

The image forming apparatus 1 according to the present embodiment has a block configuration illustrated in FIG. 9. The image forming apparatus 1 includes a central processing unit (CPU) 101, a read-only memory (ROM) 102, a random access memory (RAM) 103, a main-scanning driver 104, a print head driver 105, the color measurement control unit 106, a sheet conveying unit 107, and a sub-scanning driver 108. The image forming apparatus 1 further includes the print head 20, the encoder sensor 21, and the image capturing unit 30 mounted on the carriage 6 as described above.

The ROM 102 stores therein computer programs, such as a basic program for the image forming apparatus 1 and a color adjustment program, and necessary system data, for example. Based on the computer programs stored in the ROM 102, the CPU 101 controls each unit in the image forming apparatus 1 to perform basic processing of the image forming apparatus 1 while using the RAM 103 as a work memory. In addition, based on RGB values acquired by the image capturing unit 30 and colorimetric values derived in color measurement performed by the color measurement control unit 106, the CPU 101 performs color adjustment when forming an image.

To control the carriage 6, the CPU 101 controls drive of the main-scanning driver 104 based on the encoder value received from the encoder sensor 21, thereby controlling movement of the carriage 6 in the main-scanning direction. To control the sheet conveying unit 107, the CPU 101 controls drive of the sheet conveying unit 107, such as a sub-scanning motor and a carriage roller, which are not illustrated, via the sub-scanning driver 108. The CPU 101 controls an ejection timing of ink from the print head 20 and the amount of ejected ink via the print head driver 105. The CPU 101 controls lighting of the illumination light source 37 of the image capturing unit 30 and a timing of positioning of the lens 36a via the color measurement control unit 106.

As described above, to generate a colorimetric value used for color adjustment for accurately reproducing colors of image data to be recorded and output as an image in colors desired by a user, the image capturing unit 30 captures the colorimetric adjustment patches CP formed on the recording medium P by the print head 20 when performing color measurement as will be described later. The image capturing unit 30 then outputs an RGB value thus acquired to the CPU 101.

Figure 10:
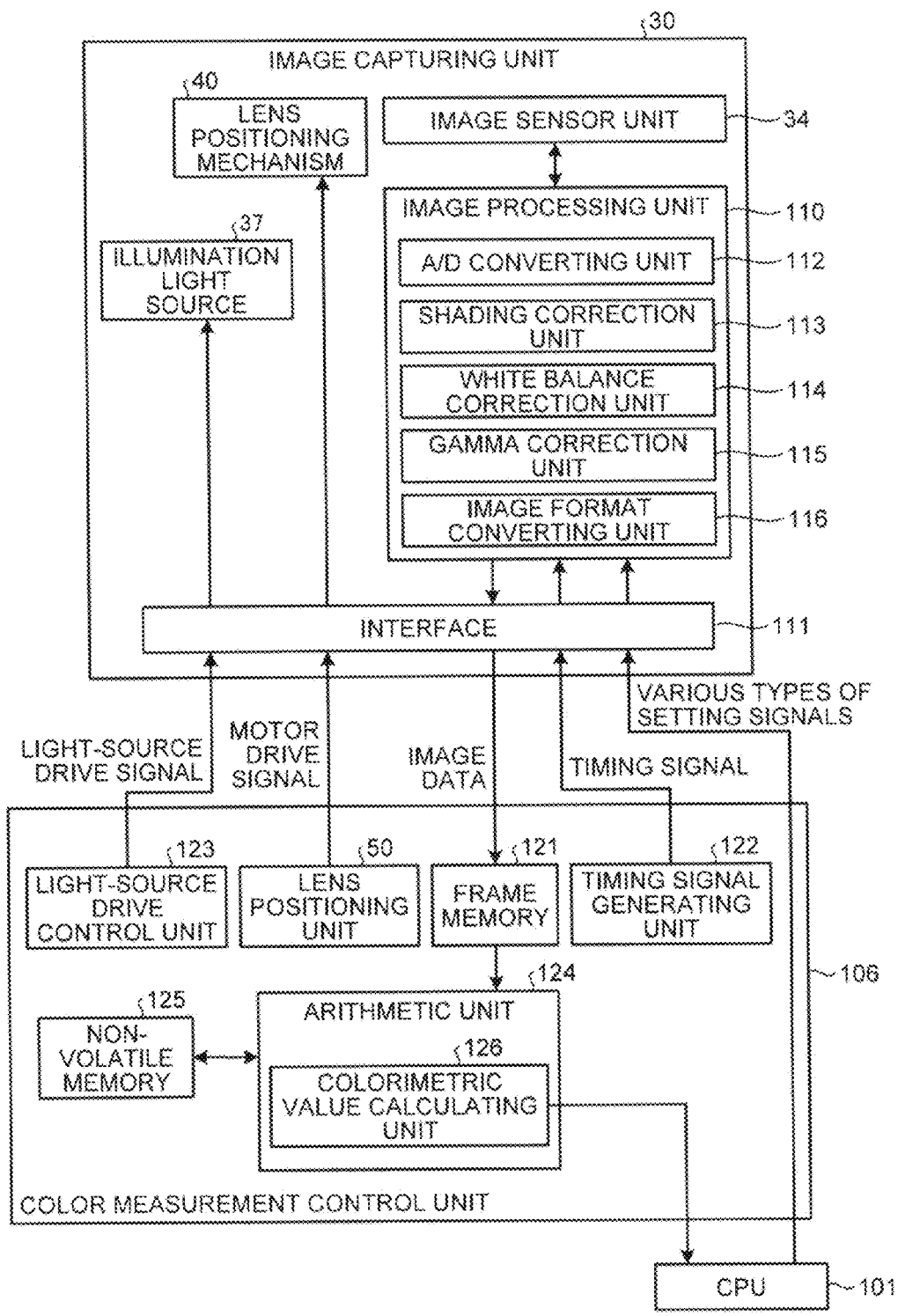
FIG. 10 is a block diagram of configurations of the image capturing unit and a color measurement control unit.

The image capturing unit 30 and the color measurement control unit 106 have block configurations illustrated in FIG. 10. The image capturing unit 30 includes the illumination light source 37, the image sensor unit 34, and the lens positioning mechanism 40. The image capturing unit 30 further includes an image processing unit 110 and an interface 111. The image processing unit 110 includes an analog-digital (A/D) converting unit 112, a shading correction unit 113, a white balance correction unit 114, a gamma correction unit 115, and an image format converting unit 116.

In the image capturing unit 30, the image sensor unit 34 captures the subject and the reference chart KC simultaneously and outputs analog RGB image data thus acquired to the image processing unit 110. The image processing unit 110 performs necessary image processing on the analog RGB image data transmitted from the image sensor unit 34 and outputs the RGB image data to the color measurement control unit 106.

The A/D converting unit 112 of the image processing unit 110 converts the analog RGB image data received from the image sensor unit 34 into digital data and outputs the RGB image data to the shading correction unit 113.

The shading correction unit 113 corrects an error in the RGB image data received from the A/D converting unit 112 due to uneven illuminance of illumination light output from the illumination light source 37 to the image capturing range of the image sensor unit 34. The shading correction unit 113 then outputs the RGB image data to the white balance correction unit 114.

The white balance correction unit 114 corrects white balance of the RGB image data on which the shading correction is performed and outputs the RGB image data to the gamma correction unit 115.

The gamma correction unit 115 corrects the image data received from the white balance correction unit 114 so as to compensate for the linearity in the sensitivity of the image sensor unit 34 and outputs the image data to the image format converting unit 116.

The image format converting unit 116 converts the image data on which the gamma correction is performed into any format and outputs the image data to the color measurement control unit 106 via the interface 111.

The interface 111 receives various types of setting signals, a timing signal, and a light-source drive signal from the color measurement control unit 106 for the image capturing unit 30. Furthermore, the interface 111 transmits image data from the image capturing unit 30 to the color measurement control unit 106.

The color measurement control unit 106 includes a frame memory 121, a timing signal generating unit 122, a light-source drive control unit 123, an arithmetic unit 124, and a non-volatile memory 125. The arithmetic unit 124 includes a colorimetric value calculating unit 126.

The frame memory 121 temporarily stores therein image data transmitted from the image capturing unit 30 and outputs the image data thus stored to the arithmetic unit 124.

Figure 11:
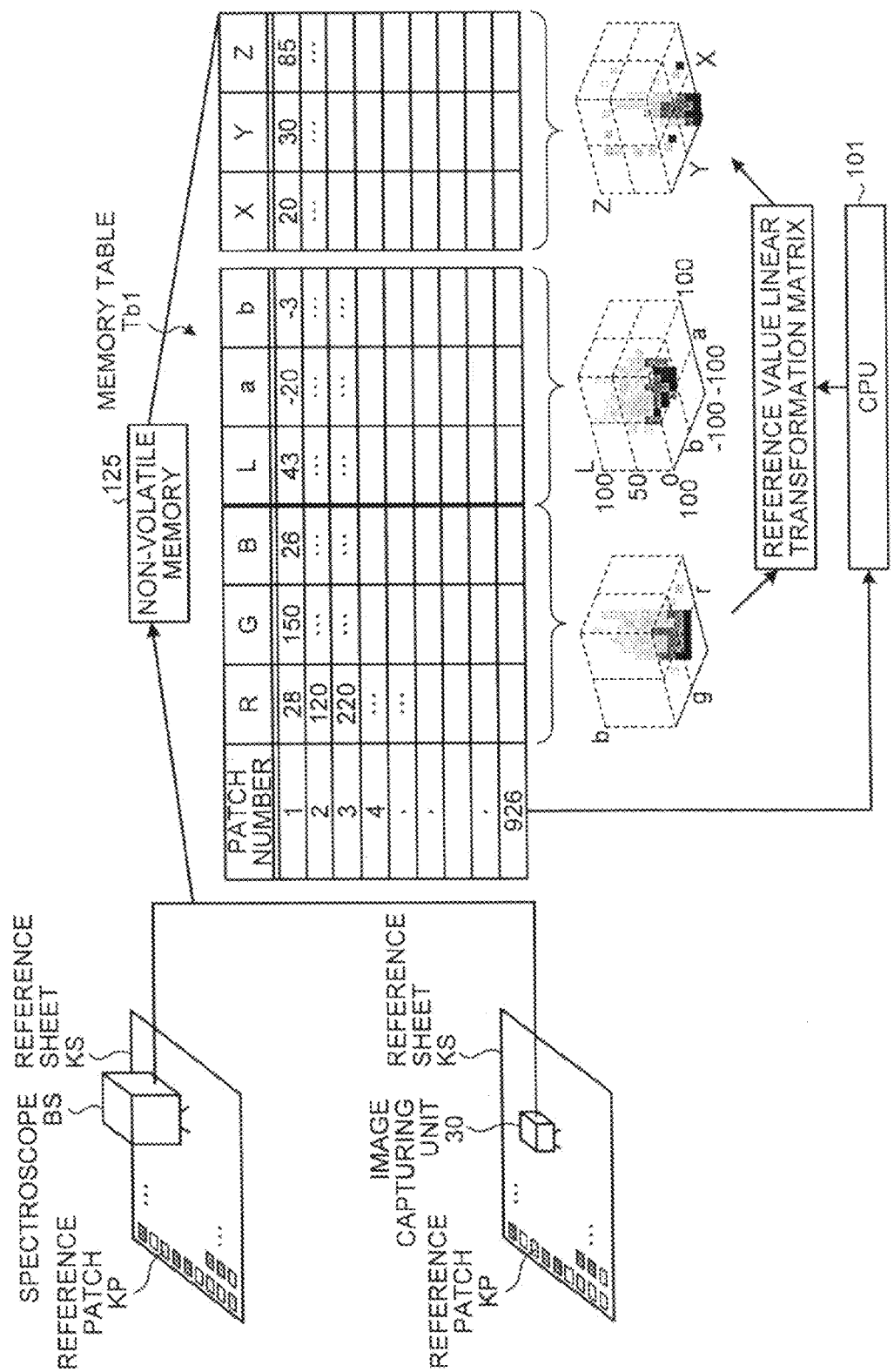
FIG. 11 is a view for explaining acquisition of a reference colorimetric value and an image capturing reference RGB value from a reference sheet and acquisition of a reference value linear transformation matrix.

As illustrated in FIG. 11, the non-volatile memory 125 stores at least one of Lab values and XYZ values (both the Lab values and the XYZ values in FIG. 11) as reference colorimetric values in a memory table Tb1 in the non-volatile memory 125 in association with patch numbers. The Lab values and the XYZ values are colorimetric values obtained as results of color measurement performed by the spectroscope BS on a plurality of reference color patches KP formed as an array on the reference sheet KS.

If the reference colorimetric values are stored in the memory table Tb1 in the non-volatile memory 125 and the image forming apparatus 1 is in an initial state, the reference sheet KS is set on the platen 14 in the image forming apparatus 1. The image forming apparatus 1 then controls movement of the carriage 6 and causes the image capturing unit 30 to read the same reference patches KP as those read by the spectroscope BS on the reference sheet KS. Subsequently, the image forming apparatus 1 stores the image capturing reference RGB values thus obtained in the memory table Tb1 in the non-volatile memory 125 in association with the patch numbers, that is, in association with the reference colorimetric values. Furthermore, the image forming apparatus 1 captures each patch on the reference chart KC with the image capturing unit 30, thereby obtaining the RGB value. The image forming apparatus 1 stores the RGB value of each patch on the reference chart KC as an initial reference RGB value RdGdBd in the memory table Tb1 in the non-volatile memory 125 under the control of the arithmetic unit 124.

If the image forming apparatus 1 stores the reference colorimetric values, the image capturing reference RGB values, and the initial reference RGB values RdGdBd in the non-volatile memory 125, the colorimetric value calculating unit 126 derives a reference value linear transformation matrix that mutually transforms a pair of the XYZ value of the reference colorimetric value and the image capturing reference RGB value stored in the non-volatile memory 125, that is, a pair of the XYZ value and the image capturing reference RGB value of the same patch number. The colorimetric value calculating unit 126 then stores the reference value linear transformation matrix thus derived in the non-volatile memory 125.

The image forming apparatus 1 performs the processing described above in the initial state and registers the reference colorimetric values, the image capturing reference RGB values, and the initial reference RGB values RdGdBd obtained as results of the processing in the memory table Tb1 in the non-volatile memory 125. Subsequently, the image forming apparatus 1 derives and stores the reference value linear transformation matrix in the non-volatile memory 125.

In the image forming apparatus 1 according to the present embodiment, the image sensor unit 34 simultaneously captures the colorimetric adjustment color patches CP serving as the subject formed on the recording medium P by the print head 20 that changes because of aging, for example, and the reference chart KC arranged in the frame body 32 when performing color measurement as will be described later. The image sensor unit 34 then outputs image data including the colorimetric adjustment color patches CP and the reference chart KC to the color measurement control unit 106. The color measurement control unit 106 transforms the colorimetric adjustment color patches CP captured by the image sensor unit 34 in the color adjustment and acquired from the image capturing unit 30 into the initial reference RGB value RdGdBd of the patches Pa to Pe on the reference chart KC read and stored simultaneously when the image capturing unit 30 reads the reference color patches (hereinafter, referred to as initial reference color patches) on the reference sheet KS. Subsequently, the color measurement control unit 106 performs, on the initial reference RGB value RdGdBd, color measurement for calculating colorimetric values by extracting a portion having linearity among the colorimetric adjustment patches CP and linearly transforming the portion.

In other words, the arithmetic unit (calculating unit) 124 controls the operations of the color measurement control unit 106. The colorimetric value calculating unit 126 performs color measurement and outputs the colorimetric values obtained as results of the color measurement to the CPU 101. The CPU 101 performs color adjustment on image data using the colorimetric values and controls the print head 20 based on the image data on which the color adjustment is performed. Thus, the image forming apparatus 1 forms an image with improved color reproducibility.

The lens positioning unit 50 is formed of a CPU, a ROM, a RAM, or a microcomputer chip, for example. The lens positioning unit 50 controls the motor drive signal supplied to the lens positioning mechanism 40 at a lens positioning timing of the CPU 101 based on a lens positioning program stored in a memory, such as a ROM. Thus, the lens positioning unit 50 controls drive of the lens positioning mechanism 40, that is, controls rotational drive of the driving motors 41a and 41b, thereby positioning the lens 36a of the image sensor unit 34.

The image forming apparatus 1 according to the present embodiment includes the color measuring device that executes a color measurement method for achieving color reproducibility reasonably and stably, which will be described later. The color measuring device is configured by reading and loading a color measurement program for executing the color measurement method according to the present embodiment on the ROM 102 or the non-volatile memory 125, for example. The color measurement program is recorded in a computer-readable recording medium, such as a ROM, an electrically erasable and programmable read only memory (EEPROM), an erasable and programmable read only memory (EPROM), a flash memory, a flexible disk, a compact disc read-only memory (CD-ROM), a compact disc rewritable (CD-RW), a digital versatile disk (DVD), a secure digital (SD) card, and a magneto-optical disc (MO). The color measurement program is a computer-executable program described in legacy programming languages and object-oriented programming languages, such as assembler, C, C++, C#, and Java (registered trademark). The color measurement program can be distributed in a manner stored in the recording medium described above.

Advantageous effects of the present embodiment will now be described. The image forming apparatus 1 according to the present embodiment executes the color measurement method for achieving color reproducibility reasonably and stably.

As illustrated in FIG. 11, the image forming apparatus 1 according to the present embodiment stores at least one of the Lab values and the XYZ values as the reference colorimetric values in the memory table Tb1 in the non-volatile memory 125 in association with the patch numbers. The Lab values and the XYZ values are the results of color measurement performed by the spectroscope BS on the reference color patches KP formed as an array on the reference sheet KS.

If the reference colorimetric values are stored in the memory table Tb1 in the non-volatile memory 125 and the image forming apparatus 1 is in the initial state because of being manufactured or overhauled, for example, the reference sheet KS is set on the platen 14 in the image forming apparatus 1. The image forming apparatus 1 then controls movement of the carriage 6 and causes the image capturing unit 30 to read the same reference patches as those read by the spectroscope BS on the reference sheet KS. At this time, the image capturing unit 30 also captures each patch (initial reference color patch) on the reference chart KC arranged in the frame body 32 as illustrated in FIG. 12.

Figures 13A, 13B:
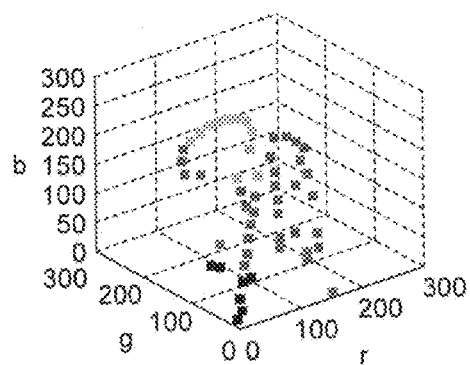
FIGS. 13A and 13B are schematics of an example of an initial reference RGB value.

If the image forming apparatus 1 causes the image capturing unit 30 to capture the reference patches on the reference sheet KS and each patch on the reference chart KC, the arithmetic unit 124 of the color measurement control unit 106 stores the image capturing reference RGB values, that is, a device-dependent signal in the memory table Tb1 in the non-volatile memory 125 in association with the patch numbers, that is, in association with the reference colorimetric values as illustrated in FIG. 11. The image capturing reference RGB values are RGB values acquired by the image processing unit 110 processing the image data obtained by capturing the reference patches on the reference sheet KS. Furthermore, the arithmetic unit 124 stores the initial reference RGB values RdGdBd, which are RGB values acquired by the image processing unit 110 processing the image data obtained by reading the initial reference color patches on the reference chart KC, in the non-volatile memory 125 as illustrated in FIG. 13A.

Figure 12:
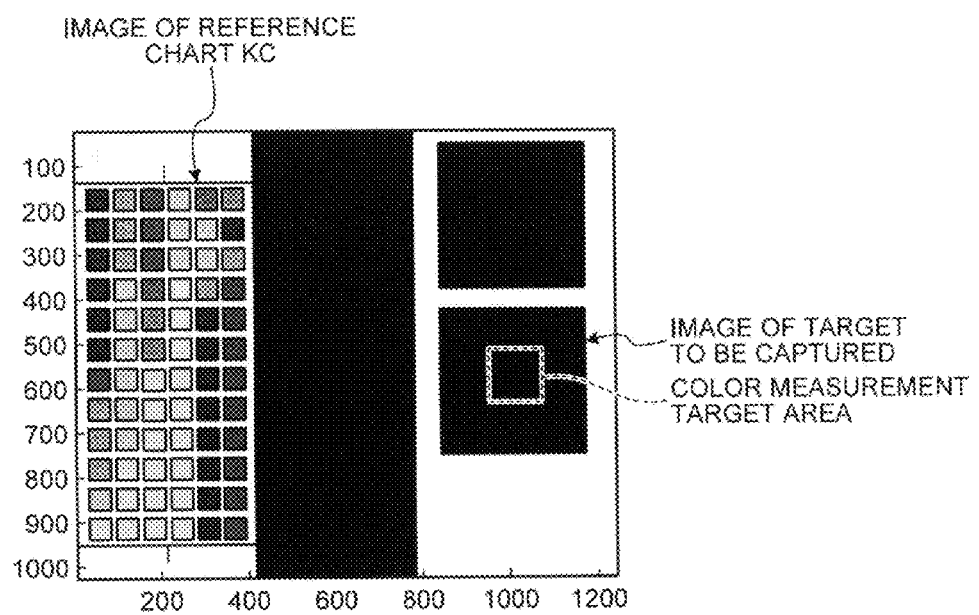
FIG. 12 is a schematic of an example of image data obtained by simultaneously capturing the reference chart and a target to be captured.

The arithmetic unit 124 calculates the average value for each predetermined area, that is, an area indicated by a dashed line in FIG. 12 (a color measurement target area) in the image data of the initial reference color patches on the reference chart KC read by the image capturing unit 30 as the initial reference RGB values RdGdBd. By averaging a number of pixels in the color measurement target area to calculate the initial reference RGB values RdGdBd in this manner, it is possible to reduce the influence of noise and to increase bit resolution. FIG. 13B is a scatter diagram in which the initial reference RGB values RdGdBd are plotted. FIG. 13A illustrates the non-volatile memory 125 storing therein reference Lab values Ldadbd obtained by transforming the initial reference RGB values RdGdBd into the Lab values and reference XYZ values xdydzd obtained by transforming the initial reference RGB values RdGdBd into the XYZ values as well.

If the image forming apparatus 1 stores the reference colorimetric values, the image capturing reference RGB values, and the initial reference RGB values RdGdBd in the non-volatile memory 125, the colorimetric value calculating unit 126 of the arithmetic unit 124 derives a reference value linear transformation matrix that mutually transforms a pair of the XYZ value of the reference colorimetric value and the image capturing reference RGB value stored in the non-volatile memory 125, that is, a pair of the XYZ value and the image capturing reference RGB value of the same patch number. The colorimetric value calculating unit 126 then stores the reference value linear transformation matrix thus derived in the non-volatile memory 125.

In this state, in the image forming apparatus 1, the CPU 101 controls movement of the carriage 6 in the main-scanning direction, conveyance of the recording medium P performed by the sheet conveying unit 107, and drive of the print head 20 based on image data and print settings received from the outside, for example. Thus, the image forming apparatus 1 controls ejection of the ink from the print heads 20y, 20m, 20c, and 20k of the print head 20 while conveying the recording medium P intermittently, thereby recording and outputting an image on the recording medium P.

At this time, the amount of ink ejected from the print heads 20y, 20m, 20c, and 20k may possibly change because of the characteristics unique to each device and aging, for example. The change in the amount of ejected ink causes the image to be formed with colors different from those of the image desired by the user, resulting in deterioration in the color reproducibility.

To address this, the image forming apparatus 1 calculates the colorimetric value at a predetermined color adjustment timing. Based on the colorimetric value, the image forming apparatus 1 performs color adjustment for adjusting colors.

Figure 14:
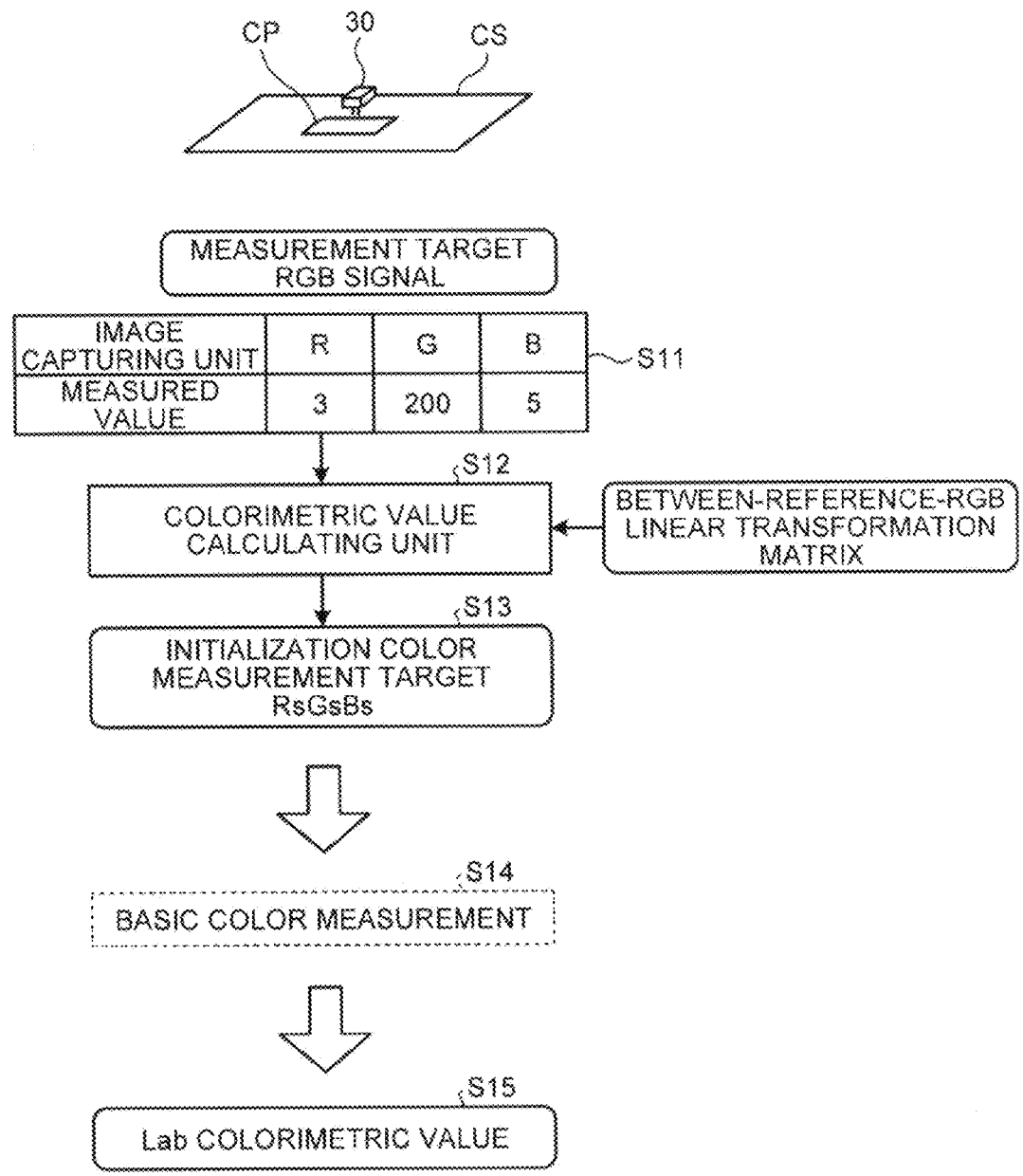
FIG. 14 is a view for explaining color measurement.

In other words, at the color adjustment timing, the image forming apparatus 1 causes the print head 20 to form a plurality of color patches (colorimetric adjustment color patches) CP on the recording medium P, thereby recording and outputting the colorimetric adjustment sheet CS as illustrated in FIG. 14. The colorimetric adjustment sheet CS is obtained by the print head 20 forming and outputting the colorimetric adjustment color patches CP, which are a plurality of color patches for colorimetric adjustment, on a sheet. The colorimetric adjustment color patches CP reflect output characteristics of the image forming apparatus 1 at the color adjustment timing, specifically, output characteristics of the print head 20. The color patch data of the colorimetric adjustment color patches CP is stored in advance in the non-volatile memory 125, for example.

The image forming apparatus 1 transforms color measurement target RGB values (color measurement RGB values) obtained by capturing the colorimetric adjustment color patches CP on the colorimetric adjustment sheet CS into the initial reference RGB values RdGdBd as will be described later. The image forming apparatus 1 then selects reference colorimetric values (neighborhood reference colorimetric values) closer to a colorimetric value into which the initial reference RGB value RdGdBd is transformed among the reference colorimetric values registered in the memory table Tb1 in the non-volatile memory 125. The image forming apparatus 1 then obtains a colorimetric value from a color measurement target RGB value based on the neighborhood reference colorimetric values thus selected. Based on image data on which color conversion is performed using the colorimetric value, the image forming apparatus 1 outputs an image with the print head 20. As a result, it is possible to improve the color reproducibility in image formation performed by the image forming apparatus 1.

If the colorimetric adjustment sheet CS is set on the platen 14 or if the colorimetric adjustment sheet CS is recorded and held on the platen 14 without being discharged as illustrated in FIG. 14, the image forming apparatus 1 controls movement of the carriage 6 to capture the colorimetric adjustment color patches CP on the colorimetric adjustment sheet CS placed on the platen 14 with the image capturing unit 30. At the same time, the image forming apparatus 1 also captures the patches on the reference chart KC with the image capturing unit 30. Thus, the image capturing unit 30 simultaneously captures the colorimetric adjustment color patches CP on the colorimetric adjustment sheet CS and the patches on the reference chart KC with the image capturing unit 30. Subsequently, the image processing unit 110 of the image capturing unit 30 performs necessary image processing on image data of the colorimetric adjustment color patches CP on the colorimetric adjustment sheet CS and image data of the patches on the reference chart KC. The image processing unit 110 then transmits the image data (RGB values) of the colorimetric adjustment color patches CP on the colorimetric adjustment sheet CS to the color measurement control unit 106 as color measurement target RGB values, that is, a device-dependent signal. Furthermore, the image processing unit 110 transmits the image data (RGB values) of the patches on the reference chart KC to the color measurement control unit 106 as color measurement reference RGB values RdsGdsBds. Subsequently, the color measurement control unit 106 temporarily stores the values in the frame memory 121 as illustrated in FIG. 14 (Step S11).

The colorimetric value calculating unit 126 of the arithmetic unit 124 in the color measurement control unit 106 transforms the color measurement target RGB values stored in the frame memory 121 into initialization color measurement target RGB values RsGsBs using a between-reference-RGB linear transformation matrix, which will be described later (Steps S12 and S13).

The arithmetic unit 124 of the color measurement control unit 106 uses the initialization color measurement target RGB value RsGsBs thus transformed as the color measurement target RGB values (Step S14) and performs basic color measurement, which will be described, to acquire Lab colorimetric values (Step S15).

Figure 15:
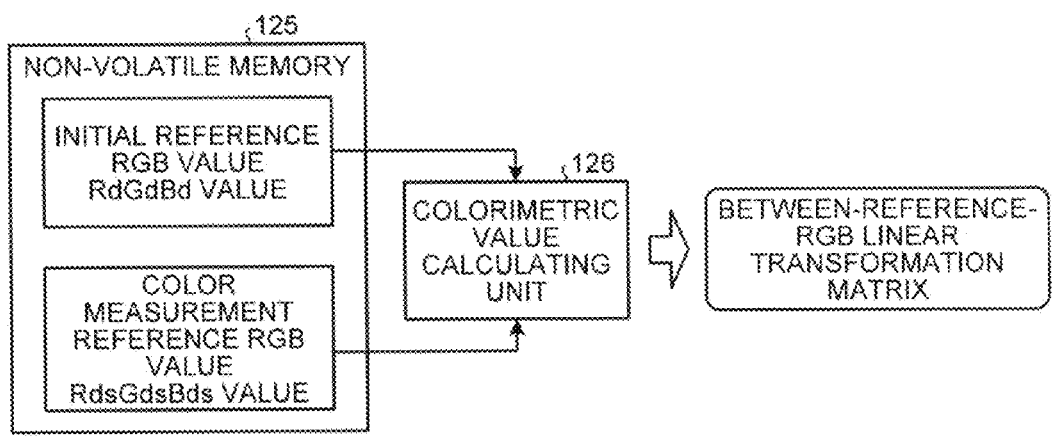
FIG. 15 is a view for explaining generation of a between-reference-RGB linear transformation matrix.
Figure 16:
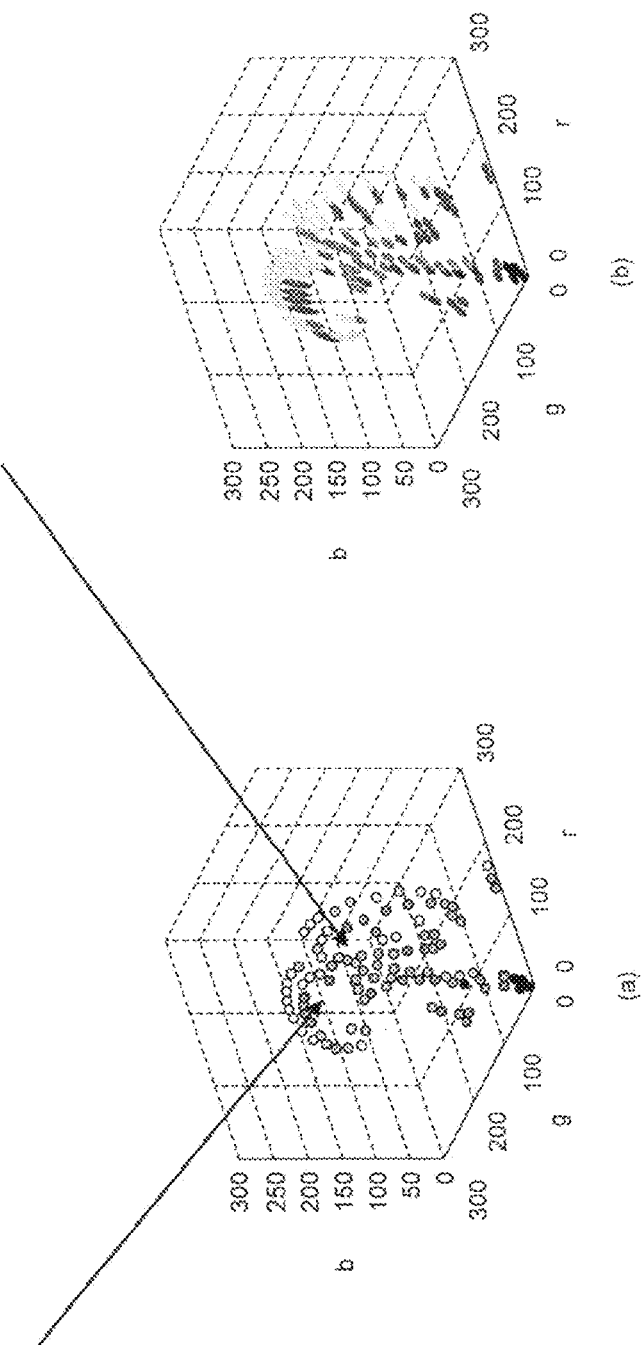
FIG. 16 is a schematic of a relationship between the initial reference RGB value and a color measurement reference RGB value.

Subsequently, the colorimetric value calculating unit 126 of the arithmetic unit 124 in the image forming apparatus 1 according to the present embodiment derives the between-reference-RGB linear transformation matrix as illustrated in FIG. 15 and FIG. 16.

Specifically, the colorimetric value calculating unit 126 of the arithmetic unit 124 reads the initial reference RGB value RdGdBd and the color measurement reference RGB value RdsGdsBds from the non-volatile memory 125 as illustrated in FIG. 15. The initial reference RGB value RdGdBd is acquired by the image capturing unit 30 capturing the patches on the reference chart KC simultaneously with the reference color patches KP on the reference sheet KS at the initial state and is stored in the non-volatile memory 125. The color measurement reference RGB value RdsGdsBds is acquired by the image capturing unit 30 capturing the patches on the reference chart KC simultaneously with the colorimetric adjustment color patches CP on the colorimetric adjustment sheet CS in the color measurement and is stored in the non-volatile memory 125. The colorimetric value calculating unit 126 then derives the between-reference-RGB linear transformation matrix that transforms the color measurement reference RGB value RdsGdsBds into the initial reference RGB value RdGdBd. Subsequently, the colorimetric value calculating unit 126 stores the between-reference-RGB linear transformation matrix thus derived in the non-volatile memory 125.

Specifically, the initial reference RGB values RdGdBd are plotted in an rgb space as open circles in FIG. 16(a), and the color measurement reference RGB values RdsGdsBds are plotted in the rgb space as filled circles. As is clear from FIG. 16(a), the color measurement reference RGB values RdsGdsBds change from the initial reference RGB values RdGdBd. While the directions of change in the rgb space are nearly the same as indicated by arrows in FIG. 16(b), the directions of deviation are different depending on hues. Thus, even if the patches on the same reference chart KC are captured, the RGB values fluctuate because of aging of the illumination light source 37 and aging of the two-dimensional image sensor 35, for example.

As described above, even if the patches on the same reference chart KC are captured, the RGB values may possibly fluctuate. In this state, if the colorimetric value is calculated using the color measurement target RGB values obtained by capturing the colorimetric adjustment patches CP on the colorimetric adjustment sheet CS, an error may possibly occur in the colorimetric value by the fluctuation amount.

To address this, the image forming apparatus 1 according to the present embodiment uses an estimation method, such as the least-squares method, between the initial reference RGB values RdGdBd and the color measurement reference RGB values RdsGdsBd. Thus, the image forming apparatus 1 derives the between-reference-RGB linear transformation matrix that transforms the color measurement reference RGB values RdsGdsBds into the initial reference RGB values RdGdBd. By using the between-reference-RGB linear transformation matrix, the image forming apparatus 1 transforms the color measurement target RGB values acquired by the image capturing unit 30 capturing the colorimetric adjustment patches CP on the colorimetric adjustment sheet CS and stored in the non-volatile memory 125 into the initialization color measurement target RGB values RsGsBs. The image forming apparatus 1 then uses the initialization color measurement target RGB values RsGsBs thus transformed as the color measurement target RGB values and performs basic color measurement, which will be described, to acquire Lab colorimetric values.

The between-reference-RGB linear transformation matrix may be a nonlinear matrix of a higher order instead of a primary matrix. If the nonlinearity is high between the rgb space and the XYZ space, using a matrix of a higher order makes it possible to improve the transformation accuracy.

When capturing the reference color patches KP on the reference sheet KS or the colorimetric adjustment color patches CP on the colorimetric adjustment sheet CS serving as the subject through the opening 32c formed on the bottom surface 32a, the image capturing unit 30 simultaneously captures the patches on the reference chart KC arranged in the opening 32b on the bottom surface 32a of the frame body 32. As a result, the image capturing unit 30 can capture the patches on the reference chart KC together with the reference color patches KP on the reference sheet KS or the colorimetric adjustment color patches CP on the colorimetric adjustment sheet CS serving as the subject constantly in the same positional relationship in a stable manner.

The image sensor unit 34 of the image capturing unit 30 has an imaging lens 36b arranged in an optical path of reflected light that is reflected by the reference chart KC, passes through the opening 32b, and is incident on the two-dimensional image sensor 35. The imaging lens 36b has curvature of the depth of focus suitable for concentrating the light reflected by the reference chart KC on the two-dimensional image sensor 35. Furthermore, the image sensor unit 34 of the image capturing unit 30 has an imaging lens 36c arranged in optical paths of reflected light that is reflected by the reference color patches KP on the reference sheet KS and the colorimetric adjustment color patches CP on the colorimetric adjustment sheet CS serving as the subject and by the reference chart KC, passes through the opening 32c, and is incident on the two-dimensional image sensor 35. The imaging lens 36c has curvature of the depth of focus suitable for concentrating the light reflected by the target to be captured on the two-dimensional image sensor 35.

Therefore, the image forming apparatus 1 can read the images of the reference color patches KP, the colorimetric adjustment color patches CP, and the reference chart KC captured by the image sensor unit 34 with high accuracy. As a result, the image forming apparatus 1 can perform highly accurate color measurement.

In the image capturing unit 30, the illumination light output to the captured surface of the recording medium P through the opening 32c and the illumination light output to the reference chart KC are output from the same illumination light source 37. Therefore, the image capturing unit 30 can capture the reference chart KC and the captured surface of the recording medium P simultaneously under the same illumination conditions. Furthermore, the two illumination light sources 37 are arranged on the center line Lo positioned at nearly halfway between the reference chart KC and the recording medium P and arranged on the center line Lo symmetrically with respect to the lens unit 36. Therefore, the image capturing unit 30 can irradiate the reference chart KC and the captured area of the recording medium P evenly under nearly the same conditions.

Furthermore, in the image capturing unit 30, the opening 32c for the captured area and the reference chart KC are arranged nearly symmetrically with respect to the center line Lo connecting the center of the lens unit 36 and the illumination light sources 37. With this configuration, the image capturing conditions of the two-dimensional image sensor 35 can be made identical linearly symmetrically. As a result, it is possible to improve the accuracy in the color adjustment and the color measurement performed by the two-dimensional image sensor 35 using the reference chart KC.

Figure 17:
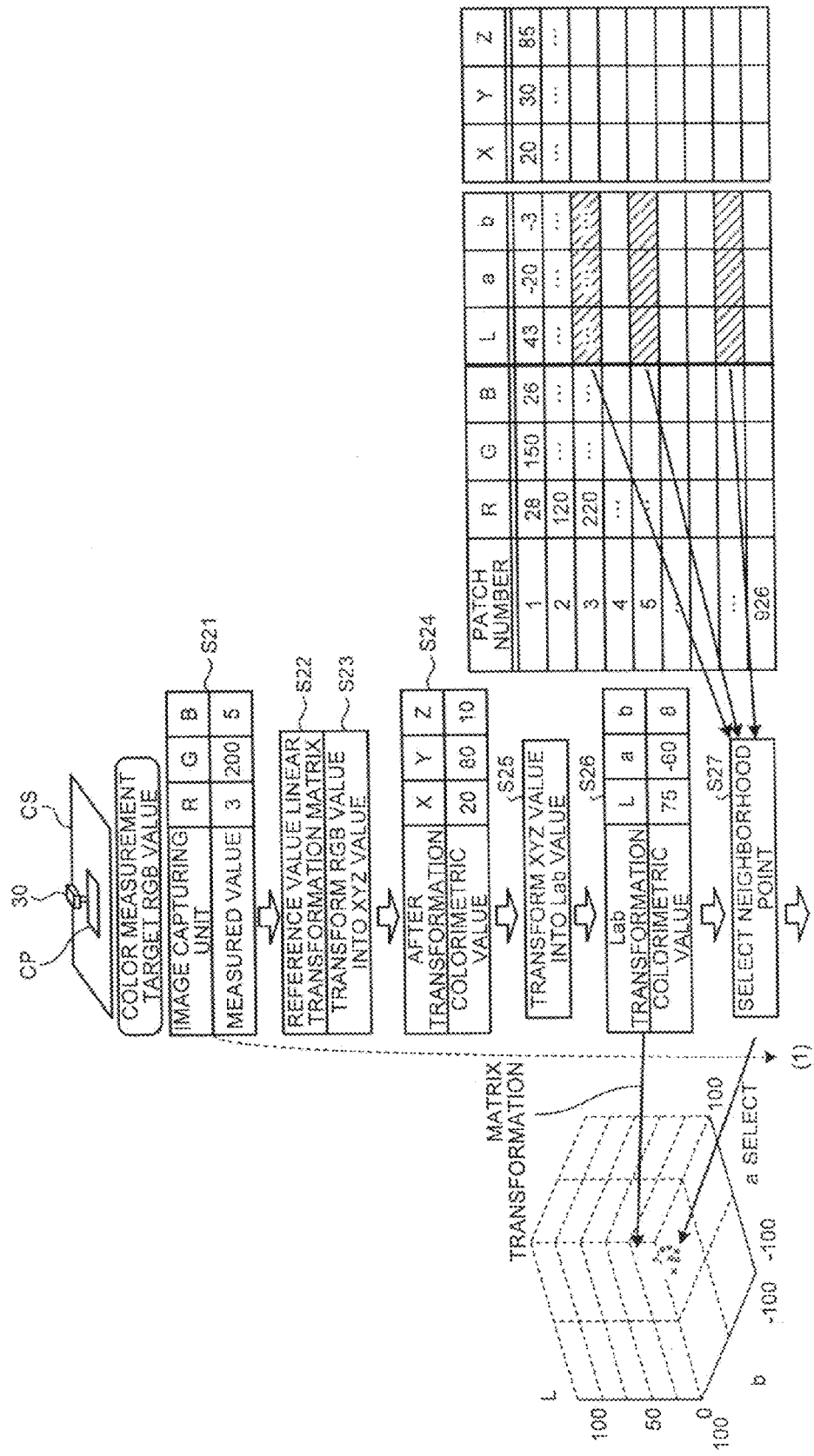
FIG. 17 is a view for explaining basic color measurement.
Figure 18:
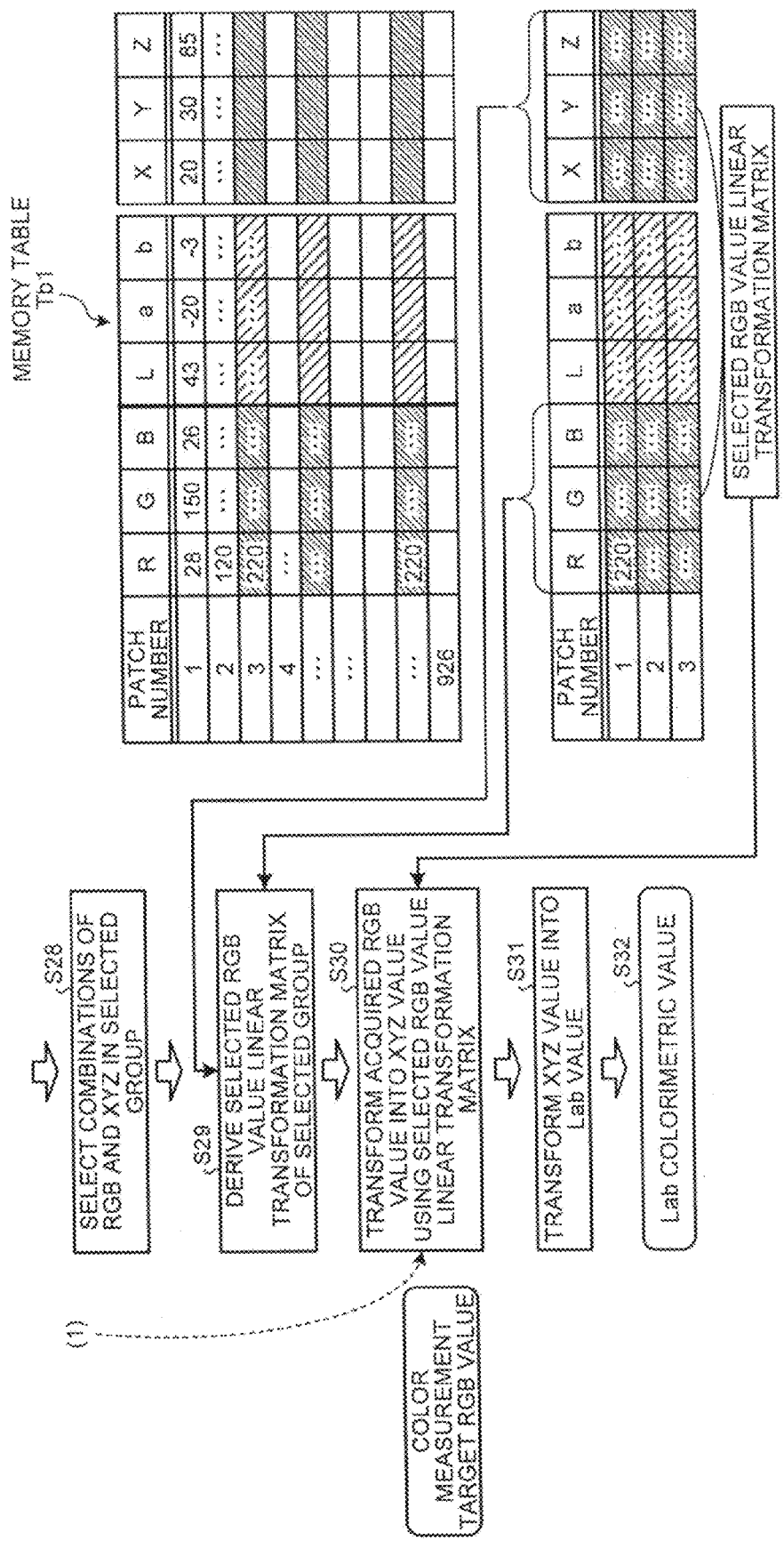
FIG. 18 is a view for explaining the basic color measurement subsequent to the processing in FIG. 17.

If the image forming apparatus 1 obtains the initial color measurement target RGB values RsGsBs as the colorimetric target RGB values as described above, the image forming apparatus 1 selects reference colorimetric values (neighborhood reference colorimetric values) closer to a colorimetric value into which the color measurement target RGB value is transformed among the reference colorimetric values registered in the memory table Tb1 in the non-volatile memory 125 as illustrated in FIG. 17 and FIG. 18. The image forming apparatus 1 then performs basic color measurement for obtaining a colorimetric value from a color measurement target RGB value based on the neighborhood reference colorimetric values thus selected. Based on image data on which color conversion is performed using the colorimetric value, the image forming apparatus 1 outputs an image with the print head 20. As a result, it is possible to improve the color reproducibility in image formation performed by the image forming apparatus 1.

Specifically, as illustrated in FIG. 17, the image forming apparatus 1 captures the colorimetric adjustment color patches CP on the colorimetric adjustment sheet CS to obtain the initial color measurement target RGB value RsGsBs as described above and stores the initial color measurement target RGB value RsGsBs in the non-volatile memory 125 as the color measurement target RGB value (Step S21). The image forming apparatus 1 then uses the reference value liner transformation matrix (Step S22) to transform the color measurement target RGB value into a first XYZ value (Step S23). The image forming apparatus 1 then stores the first XYZ value in the non-volatile memory 125 (Step S24). In FIG. 17, for example, the colorimetric value calculating unit 126 transforms a color measurement target RGB value (3, 200, 5) acquired by the image capturing unit 30 into a first XYZ value (first colorimetric value) (20, 80, 100) and stores the first XYZ value in the non-volatile memory 125.

The colorimetric value calculating unit 126 refers to the memory table Tb1 in the non-volatile memory 125 or uses a known conversion equation to transform the first XYZ value into a first Lab value (first colorimetric value) (Step S25). The colorimetric value calculating unit 126 then stores the first Lab value in the non-volatile memory 125 (Step S26). In FIG. 17, for example, the colorimetric value calculating unit 126 transforms a first XYZ value (20, 80, 100) into a first Lab value (75, −60, 8), which is an image capturing colorimetric value.

Subsequently, as illustrated in the L*a*b* space in FIG. 17, the colorimetric value calculating unit 126 searches reference colorimetric values (Lab values) of a plurality of color patches in the memory table Tb1 stored in the non-volatile memory 125. The colorimetric value calculating unit 126 then selects a group of color patches (neighborhood color patches) closer to the first Lab value in the L*a*b* space among the reference colorimetric values (Lab values) (Step S27). In the L*a*b* space in FIG. 17, for example, 60 color patches are selected and plotted in the L*a*b* space. To select the patches closer to the first Lab value, for example, distances between the point representing the first Lab value and all the points representing the reference colorimetric values (Lab values) of the color patches are derived. Thus, the reference Lab values (hatched reference Lab values in FIG. 17) of the color patches closer to the first Lab value, which is the first colorimetric value, are selected.

Subsequently, as illustrated in FIG. 18, the colorimetric value calculating unit 126 refers to the memory table Tb1 to select combinations of image capturing reference RGB values corresponding to the respective first Lab values in the group thus selected, that is, combinations of image capturing reference RGB values (selected RGB values) and reference XYZ values in association with the same patch numbers of the first Lab values in the group thus selected (Step S28). The colorimetric value calculating unit 126 then derives a selected RGB value linear transformation matrix for transformation between the image capturing reference RGB values and the reference XYZ values thus selected in combination (selected group) by using the least-squares method and stores the selected RGB value linear transformation matrix thus derived in the non-volatile memory 125 (Step S29).

The image capturing unit 30 captures each colorimetric adjustment color patch CP on the colorimetric adjustment sheet CS serving as the target to be captured, and the A/D converter 112 converts the image data thus acquired into digital data, whereby the color measurement target RGB value is obtained. The colorimetric value calculating unit 126 uses the selected RGB value linear transformation matrix to derive a second XYZ value, which is a second colorimetric value, from the color measurement target RGB value (Step S30). The colorimetric value calculating unit 126 then uses a known conversion equation to transform the second XYZ value into a second Lab value (Step S31). Thus, the colorimetric value calculating unit 126 acquires the second Lab value as a final colorimetric value (Step S32).

Based on image data on which color conversion is performed using the colorimetric value thus derived, the colorimetric value calculating unit 126 performs adjustment of an image. Subsequently, based on the image data on which the adjustment is performed, the image forming apparatus 1 drives the print head 20 to form the image.

In other words, the image forming apparatus 1 according to the present embodiment uses the reference value linear transformation matrix to derive the first Lab value obtained when capturing the reference sheet KS in the initial state from the color measurement target RGB value obtained when capturing the colorimetric adjustment color patches CP on the colorimetric adjustment sheet CS that reflects the output characteristics of the print head 20 at the color adjustment timing. The image forming apparatus 1 then selects a group of patches of reference Lab values closer to the first Lab value in the L*a*b* space among the reference Lab values of the color patches registered in the memory table Tb1. Subsequently, the image forming apparatus 1 uses the selected RGB value linear transformation matrix to transform the color measurement target RGB values corresponding to the reference Lab values thus selected into a lab value, thereby acquiring a Lab colorimetric value. Based on image data on which color conversion is performed using the colorimetric value thus derived, the colorimetric value calculating unit 126 performs adjustment of an image. Subsequently, based on the image data on which the adjustment is performed, the image forming apparatus 1 drives the print head 20 to form the image.

In the image forming apparatus 1, when capturing the reference color patches KP on the reference sheet KS or each colorimetric adjustment color patch CP on the colorimetric adjustment sheet CS as the target to be captured, the image capturing unit 30 also captures each patch on the reference chart KC attached to the frame body 32. At this time, to capture these patches with high accuracy, the lens positioning mechanism 40 moves the lens 36a, which concentrates the light reflected by these patches on the two-dimensional image sensor 35 of the image sensor unit 34, so as to change the position of the lens 36a in the direction along the optical path, under the control of the lens positioning unit 50.

Figure 19:
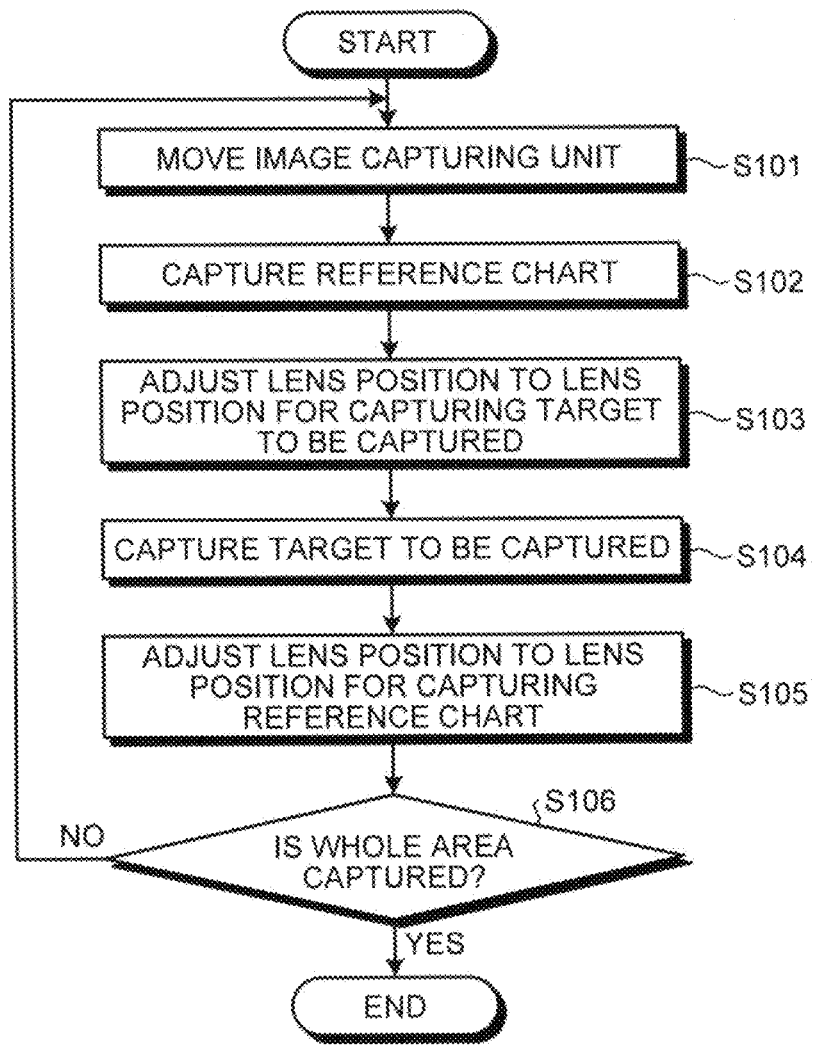
FIG. 19 is a flowchart of image capturing associated with positioning of a lens.
Figure 20:
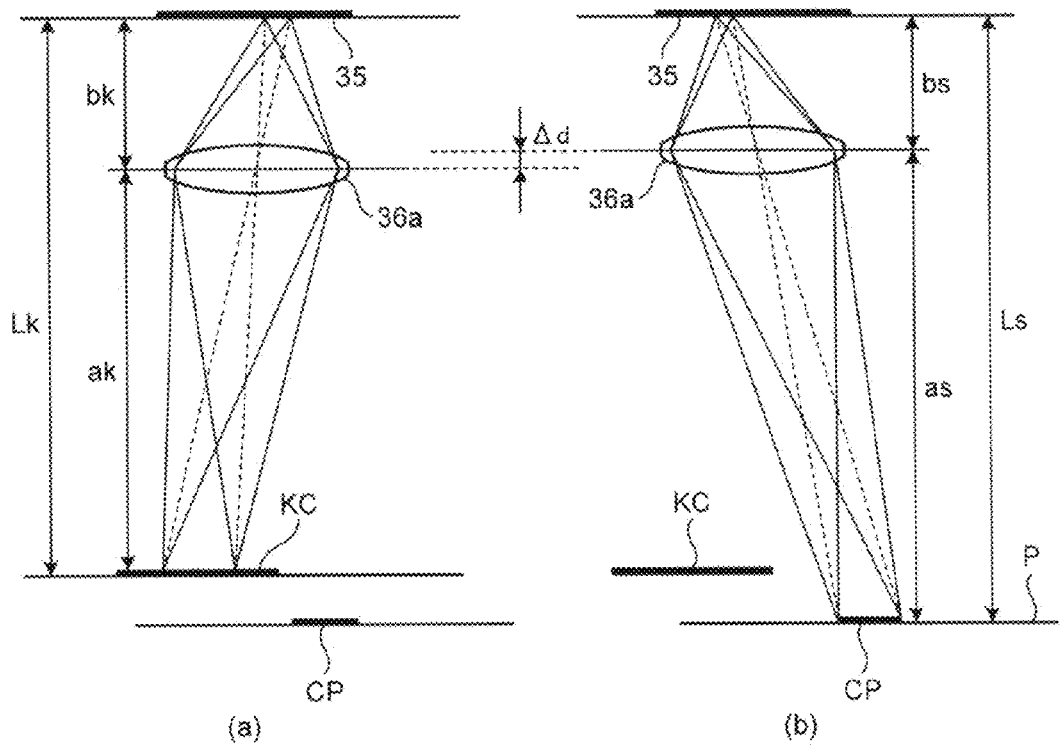
FIG. 20 is a view for explaining positioning of the lens when capturing the reference chart and the target to be captured.

In the image forming apparatus 1, the lens position control unit 50 of the color measurement control unit 106 sets the position of the lens 36a to the position for capturing the patches on the reference chart KC in the initial state. As illustrated in FIG. 19, at the timing for capturing the reference color patches KP on the reference sheet KS or the colorimetric adjustment color patches CP on the colorimetric adjustment sheet CS, the lens position control unit 50 moves the image capturing unit 30 to the image capturing position for the reference color patches KP on the reference sheet KS or the colorimetric adjustment color patches CP on the colorimetric adjustment sheet CS (hereinafter, referred to as a target to be captured as appropriate) (Step S101).

If the image capturing unit 30 is moved to the image capturing position for the target to be captured, the image forming apparatus 1 captures the patches on the reference chart KC (Step S102). If the capturing of certain patches on the reference chart KC is completed, the lens position control unit 50 outputs a motor drive signal to drive and rotate the driving motors 41a and 41b in the same direction synchronously. Thus, the guide rails 42a and 42b to which the lens holder 43 is attached are rotated in the same direction synchronously. As a result, the position of the lens holder 43 holding the lens 36a, that is, the position of the lens 36a is adjusted from the position for capturing the reference chart to a lens position for capturing the target to be captured (Step S103).

In other words, assuming that the distance between the reference chart KC and the lens 36a in capturing of the reference chart KC is ak, the distance between the lens 36a and the two-dimensional image sensor 35 is bk, the distance between the reference chart KC and the two-dimensional image sensor 35 is Lk, and the focal length of the lens 36a is f as illustrated in FIG. 20(a), the relationship among these elements is expressed by the following equation:

$$ak + bk = Lk$$

$$1/ak + 1/bk = 1/f \tag{1}$$

Furthermore, assuming that the distance between the target to be captured and the lens 36a in capturing of the target to be captured through the opening 32c is as, the distance between the lens 36a and the two-dimensional image sensor 35 is bs, and the distance between the target to be captured and the two-dimensional image sensor 35 is Ls as illustrated in FIG. 20(b), the relationship between the focal length f of the lens 36a and these elements is expressed by the following equation:

$$as + bs = Ls$$

$$1/as + 1/bs = 1/f \tag{2}$$

Therefore, positional difference Δd between the position of the lens 36a adopted when capturing the reference chart KC and the position of the lens 36a adopted when capturing the target to be captured can be expressed by Equation (3):

$$\Delta d = bk - bs \tag{3}$$

If the lens 36a is positioned at the lens position for capturing the target to be captured at Step S103, the image forming apparatus 1 causes the image capturing unit 30 to capture the target to be captured (Step S104). Subsequently, the lens position control unit 50 outputs a motor drive signal to drive and rotate the driving motors 41a and 41b, thereby rotating the guide rails 42a and 42b to which the lens holder 43 is attached. Thus, the lens position control unit 50 performs positioning for returning the position of the lens holder 43 holding the lens 36a, that is, the position of the lens 36a from the lens position for capturing the target to be captured to the position for capturing the reference chart (Step S105).

If the positioning of the lens 36a is performed, the CPU 101 determines whether the whole of the required area of the target to be captured and the reference chart KC is captured (Step S106). If capturing of the whole area is not completed yet, the system control is returned to Step S101, and the image forming apparatus 1 repeats the same image capturing (Step S101 to S106).

If capturing of the whole of the required area is completed at Step S106, the CPU 101 terminates the image capturing.

Figure 21:
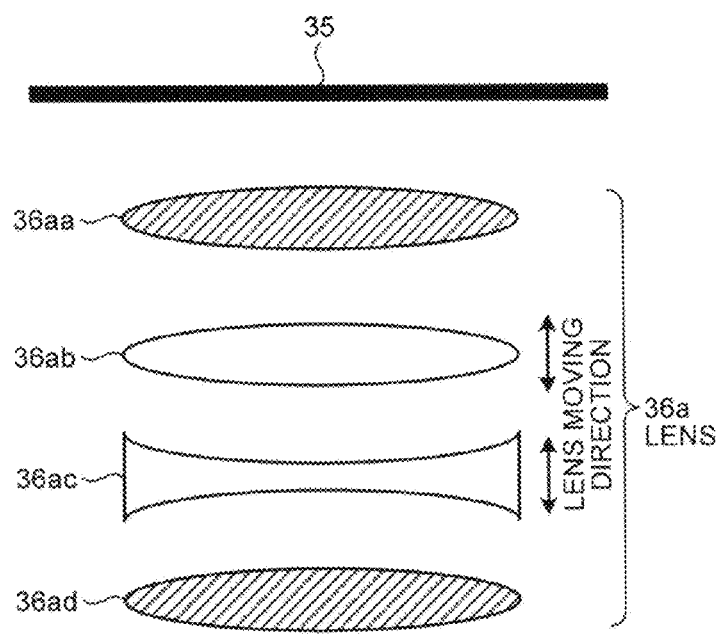
FIG. 21 is an enlarged front view of an example of a four-group zoom lens.

While the explanation has been made of the case where the lens 36a is formed of one lens or one lens material and the entire lens 36a is moved to adjust the focal length, the configuration of the lens 36a is not limited thereto. The lens 36a may be a zoom lens 36a formed of four lenses as illustrated in FIG. 21.

In this case, the lens 36a is formed of three convex lenses 36aa, 36ab, and 36ad and of one concave lens 36ac. By moving the convex lens 36ab and the concave lens 36ac positioned in the middle in directions closer to and away from the two-dimensional image sensor 35 (lens moving directions), the focal length is adjusted.

Figure 22:
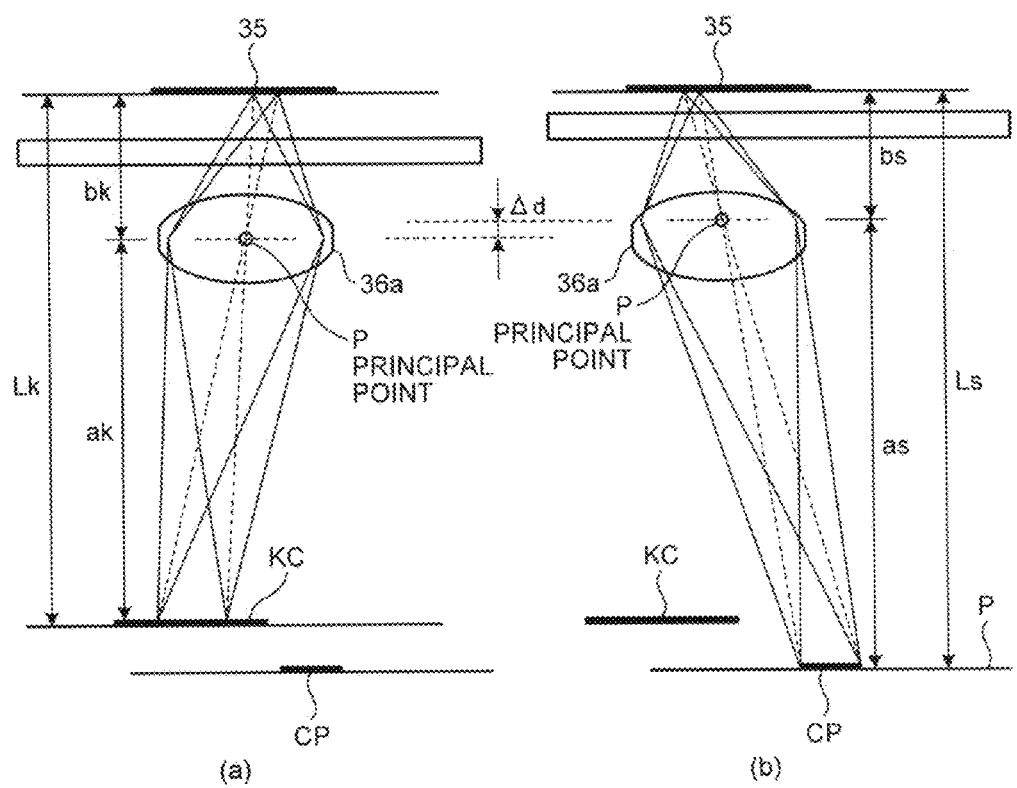
FIG. 22 is a view for explaining positioning of the lens illustrated in FIG. 21 when capturing the reference chart and the target to be captured.
Figure 23:
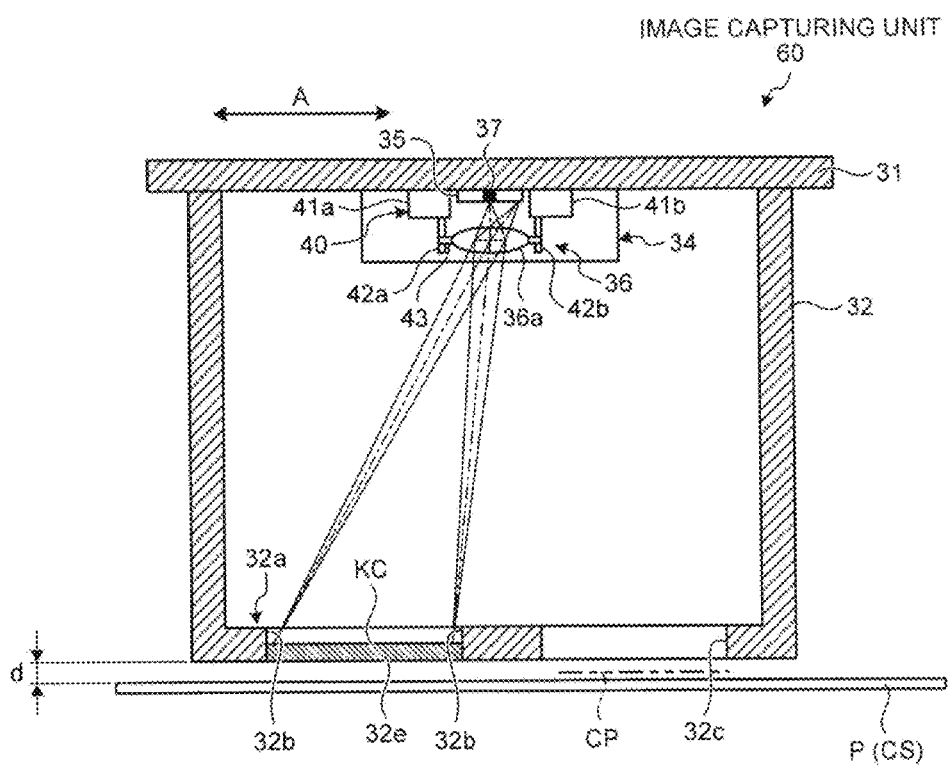
FIG. 23 is a front sectional view of another image capturing unit.

In other words, the two lenses 36aa and 36ad positioned outside are fixed in this case, and the two lenses 36ab and 36ac positioned in the middle are held by the lens holder 43 that moves in the lens moving directions by rotation of the driving motors 41a and 41b. Therefore, as illustrated in FIG. 22, the driving motors 41a and 41b drive to rotate when capturing the reference chart KC and capturing the target to be captured. As a result, the lenses 36ab and 36ac positioned in the middle and held by the lens holder 43 other than the two lenses 36aa and 36ad positioned outside move in the lens moving directions by Δd, whereby the focal length is adjusted.

Furthermore, the attachment configuration of the reference chart KC to the frame body 32 is not limited to the configuration described above. Like an image capturing unit 60 illustrated in FIG. 23, for example, the reference chart KC may be directly attached on the upper surface of a holding member 32e, and the holding member 32e may be directly attached to the opening 32b in which no recess 32d is formed.

With this configuration, it is possible to simplify the configuration of the image capturing unit 60 and to make the patch surface of the reference chart KC closer to the recording surface of the target to be captured on the recording medium P. As a result, accuracy in an image, that is, accuracy in color measurement can be improved. In this case as well, by setting the focal length f and the moving amount of the lens 36a appropriately, it is possible to capture the subject and the reference chart KC with the two-dimensional image sensor 35 focused thereon accurately.

Figure 24:
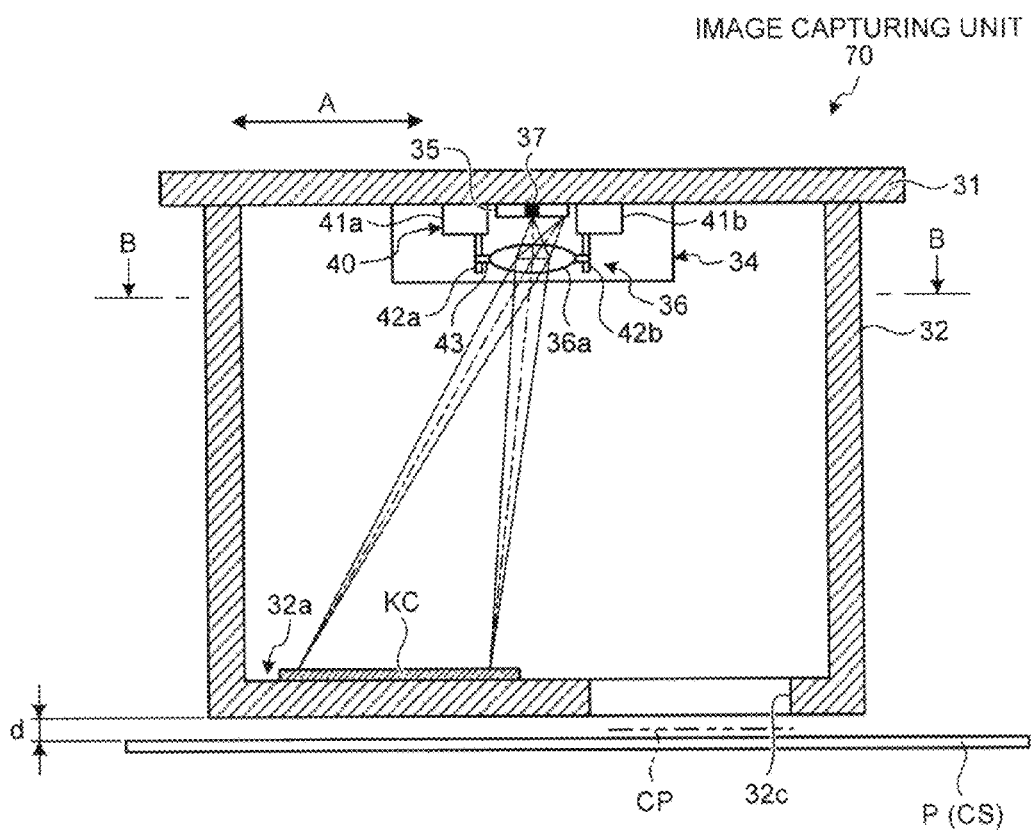
FIG. 24 is a front sectional view of still another image capturing unit.
Figure 25:
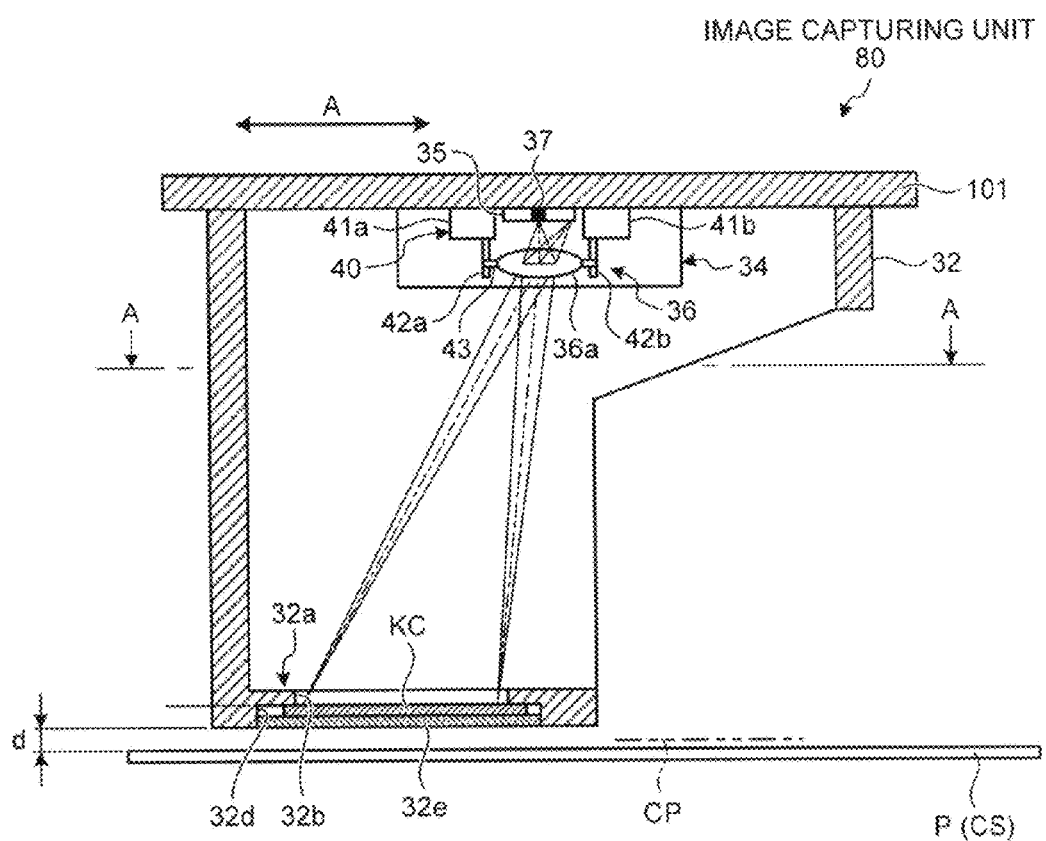
FIG. 25 is a front sectional view of an image capturing unit in which a larger opening is formed.
Figure 26:
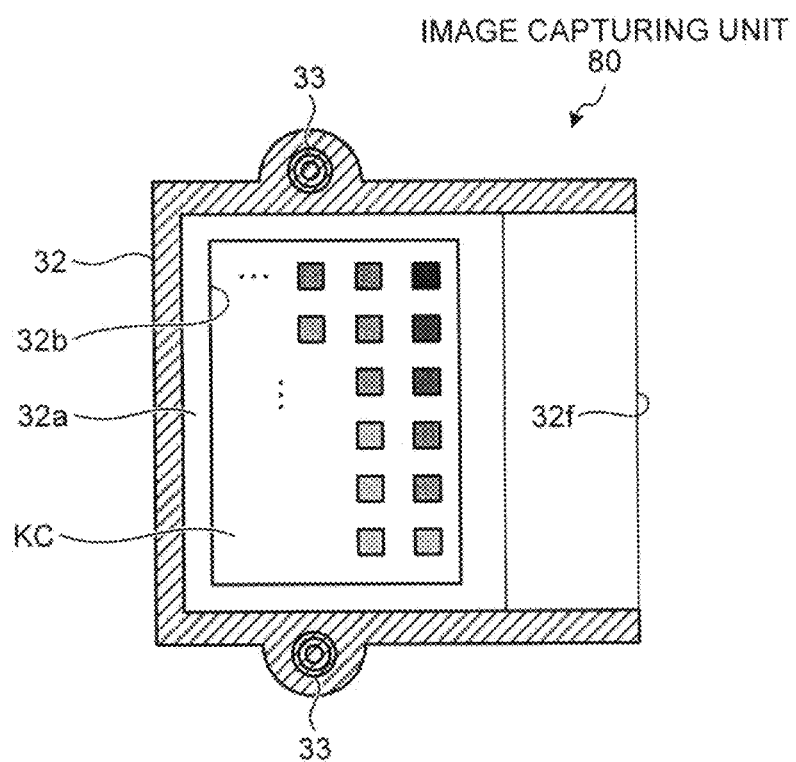
FIG. 26 is a sectional view of the image capturing unit viewed in a direction of arrow A-A in FIG. 25.

Like an image capturing unit 70 illustrated in FIG. 24, for example, the reference chart KC may be, for example, directly attached in an attachable and detachable manner to the bottom surface 32a in which no opening 32b is formed.

With this configuration, it is possible to further simplify the configuration of the image capturing unit 70 and to make the patch surface of the reference chart KC closer to the recording surface of the target to be captured on the recording medium P. As a result, accuracy in an image, that is, accuracy in color measurement can be improved. In this case as well, by setting the focal length f and the moving amount of the lens 36a appropriately, it is possible to capture the subject and the reference chart KC with the two-dimensional image sensor 35 focused thereon accurately.

If the portion to which the image capturing unit 30, 60, or 70 is attached in the image forming apparatus 1 is shielded from external light necessarily and sufficiently to capture the target to be captured and the reference chart KC with the image capturing unit 30, 60, or 70, the frame body 32 need not have a shape that prevents external light (stray light) from entering the frame body 32. Therefore, the opening 32c formed in the bottom surface 32a of the frame body 32 in the image capturing unit 30 illustrated in FIG. 4 to FIG. 8 may be formed as an opening 32f that extends to the side surface of the frame body 32 like an image capturing unit 80 illustrated in FIG. 25 and FIG. 26.

With this configuration, it is possible to reduce the frame body 32 in size and weight, thereby reducing cost.

As described above, the image forming apparatus 1 according to the present embodiment includes the two-dimensional image sensor (sensor unit) 35 that captures a predetermined range including a subject; the reference chart KC that is captured by the image sensor 35 together with the subject; the illumination light source 37 that illuminates the subject and the reference chart KC; the lens unit (lens member) 36 including one or more lenses 36a arranged in an optical path of reflected light extending from the subject and the reference chart KC to the image sensor 35; and the lens positioning mechanism (lens moving unit) 40 that moves at least one lens 36a of the lens unit 36 so as to change the position of the lens 36a in the direction along the optical path.

With this configuration, the image forming apparatus 1 can capture both the subject and the reference chart KC stably and focus the image sensor unit 34 on the subject and the reference chart KC with the lens unit 36 appropriately. As a result, the image forming apparatus 1 can capture the subject and the reference chart KC in a stable positional relationship with high accuracy.

In the image forming apparatus 1 according to the present embodiment, the lens positioning mechanism 40 includes the guide rails 42a and 42b, the driving motors (rotating unit) 41a and 41b, and the lens holder (lens holding member) 43. The pair of guide rails 42a and 42b in a rod-shape extends in the vertical direction with respect to the two-dimensional image sensor 35 with the lens unit 36 interposed therebetween and has the screw portion formed on the outer peripheral surface thereof. The driving motors 41a and 41b synchronously drive to rotate the pair of guide rails 42a and 42b, respectively. The lens holder 43 holds the lens 36a to be moved and has the screw portion that engages with the screw portion of the guide rails 42a and 42b.

With this simple configuration, the image forming apparatus 1 can perform positioning of the lens and the two-dimensional image sensor 35 accurately. As a result, the image forming apparatus 1 can focus the image sensor unit 34 on the subject and the reference chart KC with the lens unit 36 appropriately, thereby capturing the subject and the reference chart KC in a constantly stable positional relationship with high accuracy.

In the image forming apparatus 1 according to the present embodiment, the lens unit 36 is one lens 36a.

With this simple configuration, the image forming apparatus 1 can perform positioning of the lens and the two-dimensional image sensor 35 accurately. As a result, the image forming apparatus 1 can focus the image sensor unit 34 on the subject and the reference chart KC with the lens unit 36 appropriately, thereby capturing the subject and the reference chart KC in a constantly stable positional relationship with high accuracy.

Alternatively, in the image forming apparatus 1 according to the present embodiment, the lens unit 36 is formed of three or more lenses 36aa to 36ad aligned in the vertical direction with respect to the two-dimensional image sensor 35. At least one of the lenses 36ab and 36ac other than the two lenses positioned outside among the three or more lenses 36aa to 36ad is a lens moved by the lens positioning mechanism 40.

With this configuration, the image forming apparatus 1 can perform positioning of the lens and the two-dimensional image sensor 35 more accurately. As a result, the image forming apparatus 1 can focus the image sensor unit 34 on the subject and the reference chart KC with the lens unit 36 appropriately, thereby capturing the subject and the reference chart KC in a constantly stable positional relationship with high accuracy.

The image forming apparatus 1 according to the present embodiment further includes the lens position control unit (lens positioning unit) 50 that controls drive of the lens positioning mechanism 40 at the timing for capturing the subject and the timing for capturing the reference chart KC to adjust the position of the lens unit 36 in the vertical direction with respect to the two-dimensional image sensor.

With this configuration, the image forming apparatus 1 can automatically perform positioning of the lens and the two-dimensional image sensor 35 accurately. As a result, the image forming apparatus 1 can focus the image sensor unit 34 on the subject and the reference chart KC with the lens unit 36 appropriately, thereby capturing the subject and the reference chart KC in a constantly stable positional relationship with high accuracy.

While the explanation has been made of the case where the lens positioning unit 50 is provided to the color measurement control unit 106, the lens positioning unit 50 is not necessarily provided to the color measurement control unit 106. The lens positioning unit 50 may be mounted on the image capturing unit 30, for example. Alternatively, the CPU 101 of the image forming apparatus 1 may perform the function of the lens positioning unit 50 or the lens positioning unit 50 may be mounted on the board of the image forming apparatus 1, for example.

In other words, by including the lens positioning unit 50, the image capturing unit 30 independently functions as an image capturing device having a positioning function of the lens 36a.

Furthermore, by providing the lens positioning unit 50 to the color measurement control unit 106 communicable with the image capturing unit 30 and the image forming apparatus 1 itself as described above, the image forming apparatus 1 functions as an image capturing system having a positioning function with the image capturing unit 30, the lens positioning unit 50, and a communication unit (communicating unit).

Figure 27:
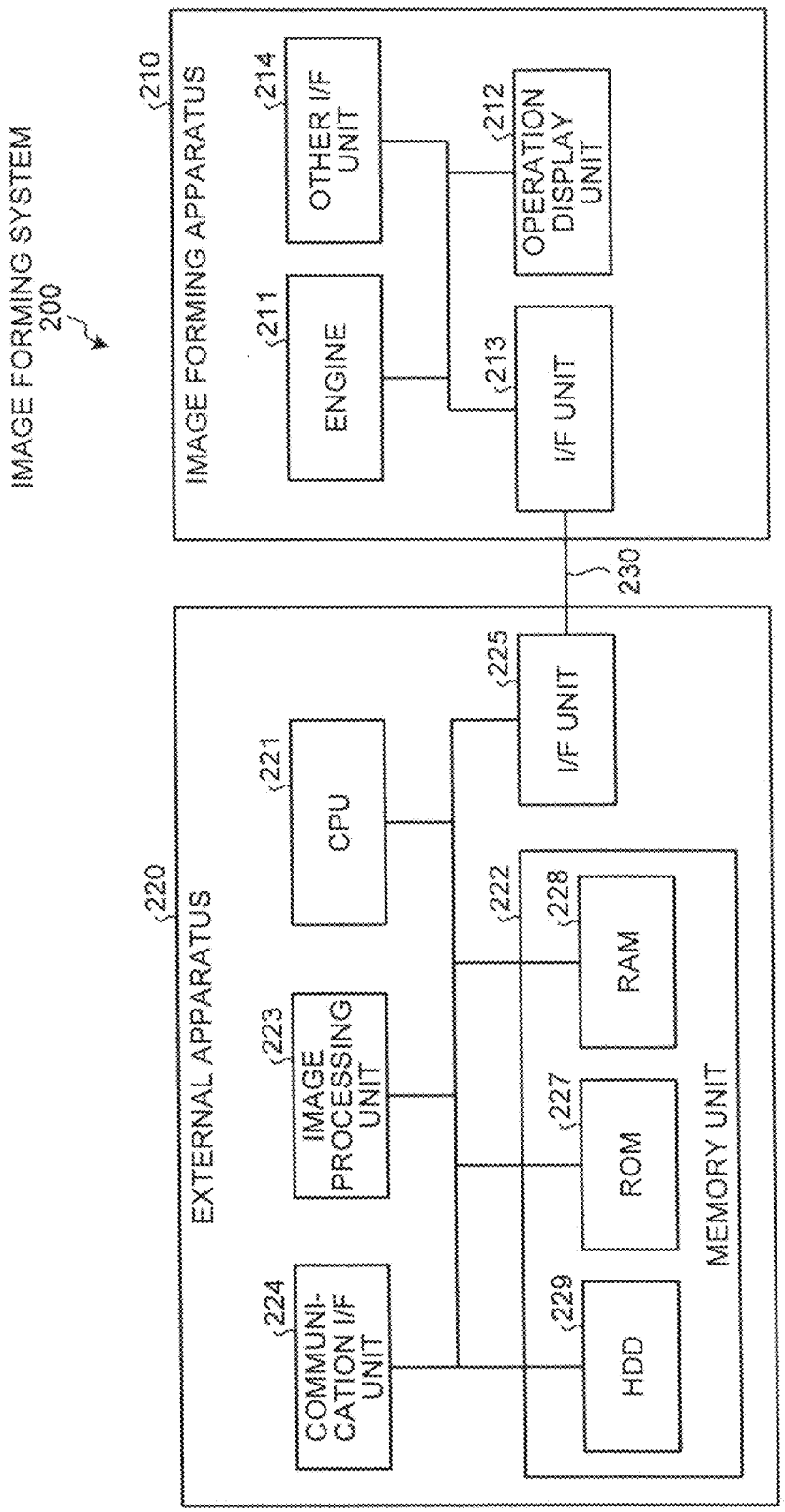
FIG. 27 is a block diagram of a system configuration of an image forming system.

While the color measurement is performed by the color measurement control unit 106 of the image forming apparatus 1 in the description above, the color measurement is not necessarily performed in the image forming apparatus 1. As illustrated in FIG. 27, for example, an image forming apparatus 210 may be connected to an external device 220 to form an image forming system (a color measurement system) 200. In this case, image data captured by the image forming apparatus 210 is output to the external device 220, and the external device 220 performs color adjustment along with color measurement on the image data. Subsequently, the image data subjected to the color adjustment is output to the image forming apparatus 210, and the image forming apparatus 210 forms an image based on the image data received from the external device 220.

Specifically, the image forming apparatus 210 includes an engine 211, an operation display unit 212, a first interface (I/F) 213, and a second I/F 214, and these units are connected via a bus 215. A computer having typical hardware and software configurations may be used as the external device 220, for example. By loading the color adjustment program including the color measurement program for performing the color adjustment along with the color measurement according to the present invention as the software, the external device 220 performs the color adjustment along with the color measurement. The external device 220 includes a CPU 221, a memory 222, an image processing unit 223, a communication I/F 224, and an I/F 225, and these units are connected via a bus 226. The memory 222 includes a ROM 227, a RAM 228, and a hard disk (HDD) 229.

The image forming apparatus 210 is connected to the external device 220 via the first I/F 213 over a line 230. The line 230 is a network, such as a dedicated line and a local area network (LAN), or the Internet and may be either of a wired network and a wireless network.

The image forming apparatus 210 forms and outputs an image on a recording medium with the engine 211 based on image data transmitted from the external device 220 under the control of the external device 220. The engine 211 forms an image on a recording medium by an ink-jet method, for example. The operation display unit 212 includes various operation keys and a display, such as a liquid crystal display (LCD). The operation display unit 212 receives various operations required for performing the operations of the image forming apparatus 210 via the operation keys. In addition, the operation display unit 212 displays and outputs various types of information of which the user is notified by the image forming apparatus 210 on the display. The second I/F 214 is used for connection of an expansion unit, for example.

The engine 211 includes a carriage that moves in the main-scanning direction in the same manner as in the embodiment, and the carriage is provided with the image capturing unit 30. The image forming apparatus 210 forms the colorimetric adjustment patches CP on a recording medium based on color patch data of the colorimetric adjustment color patches CP transmitted from the external device 220 under the control of the CPU 221 of the external device 220 to generate the colorimetric adjustment sheet CS. The image forming apparatus 210 then reads the colorimetric adjustment patches CP on the colorimetric adjustment sheet CS thus generated with an image capturing unit (image capture unit) and transmits the data thus read to the external device 220 via the first I/F 213.

The external device 220 stores an image formation control program for controlling the operations of the image forming apparatus 210, a color adjustment program for performing the color adjustment along with the color measurement according to the present invention, and necessary data in the HDD 229 or the ROM 227. The CPU 221 controls the image forming apparatus 210 based on the computer programs stored in the ROM 227 or the HDD 229, thereby causing the image forming apparatus 210 to perform basic operations and perform the color adjustment along with the color measurement according to the present invention.

The HDD 229 stores therein the computer programs described above and various types of data required to perform the color adjustment. Specifically, the various types of data includes: at least one of the Lab values and the XYZ values obtained as results of color measurement of the reference color patches KP formed as an array on the reference sheet KS described in the embodiment; the image capturing reference RGB values obtained when the image capturing unit of the image forming apparatus 210 reads the reference patches KP on the reference sheet KS; the reference value linear transformation matrix; the table of neighborhood points; the selected RGB value liner transformation matrix; the initial reference RGB value RdGdBd of each color patch on the reference chart KC read simultaneously with the reference sheet KS; the color measurement reference RGB values RdsGdsBds of the reference patches on the reference chart KC read simultaneously with the colorimetric adjustment color patches CP on the colorimetric adjustment sheet CS; and the between-reference-RGB linear transformation matrix that transforms the color measurement reference RGB values RdsGdsBds into the initial reference RGB values RdGdBd.

The communication I/F 224 is connected to an image forming apparatus, such as a scanner, a multifunction peripheral (MFP), and another external device, via a line of a network, for example, and receives image data to be output from the image forming apparatus 210. The I/F 213, the communication I/F 224, and the line 230 collectively function as a communication unit.

The image processing unit 223 performs, on image data, various types of image processing required for the engine 211 of the image forming apparatus 210 to form and output an image.

The CPU (calculating unit) 221 controls the operations of the image forming apparatus 210 as described above and performs the color measurement performed by the arithmetic unit 124 of the color measurement control unit 106, specifically, by the colorimetric value calculating unit 126 to derive a colorimetric value. The CPU 221 performs color adjustment on image data based on the colorimetric value and outputs the image data to the image forming apparatus 210.

While the external device 220 controls the operations of the image forming apparatus 210 in the image forming system 200 illustrated in FIG. 27, the image forming apparatus 210 itself may include a controller such as a CPU. In this case, the controller may control the image forming operation, and the external device 220 may perform the color measurement for deriving a colorimetric value alone or the color adjustment including the color measurement alone.

As described above, if the external device externally connected to the image forming apparatus 210 performs at least the color measurement or the color adjustment including the color measurement, it is possible to improve the color reproducibility reasonably and appropriately even in a cheaper image forming apparatus 210.

The present invention can capture a subject and a reference chart in a constantly stable positional relationship.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image capturing device comprising:
   a sensor unit that captures a predetermined range including a subject;
   a reference chart that is captured by the sensor unit together with the subject;
   an illumination light source that illuminates the subject and the reference chart;
   a lens member, including one or more lenses, arranged in an optical path of reflected light extending from the subject and the reference chart to the sensor unit, and the lens member is positioned between the reference chart and the sensor unit and between the subject and the sensor unit; and
   a lens moving unit that moves at least one lens of the lens member so as to change a position of the at least one lens in a direction along the optical path.

2. The image capturing device according to claim 1, wherein the lens moving unit includes:
   a pair of rod-shaped guide rails that extend in a direction along the optical path with the lens member interposed therebetween and have a screw portion formed on an outer peripheral surface thereof;
   a rotating unit that drives and rotates the guide rails in a synchronized manner; and
   a lens holding member that holds the lens to be moved and has a screw portion that engages with the screw portion of the guide rails.

3. The image capturing device according to claim 1, wherein the lens member is a single imaging lens.

4. The image capturing device according to claim 1, wherein
   the lens member is formed of three or more lenses aligned in a direction along the optical path, and
   at least one lens other than two lenses positioned outside among the three or more lenses is moved by the lens moving unit.

5. The image capturing device according to claim 1, further comprising a lens positioning unit that controls drive of the lens moving unit at a timing for capturing the subject and a timing for capturing the reference chart so as to adjust the position of the lens member in the direction along the optical path so as to move the lens member toward or away from the reference chart and toward or away from the subject.

6. A color measuring device comprising:
   the image capturing device according to claim 1; and
   a calculating unit that calculates a colorimetric value of the subject based on image capturing data of the subject and the reference chart captured by the image capturing unit.

7. A color measuring system comprising:
   the image capturing device according to claim 1;
   a calculating unit that calculates a colorimetric value of the subject based on image capturing data of the subject and the reference chart captured by the image capturing unit;
   a positioning communication unit that connects the image capturing unit and the lens positioning unit; and
   a color measurement communication unit that connects the image capturing unit and the calculating unit.

8. An image forming apparatus comprising:
   the color measuring device according to claim 7; and
   an image forming unit that forms an image using image data on which color adjustment is performed based on a colorimetric value measured by the color measuring device.

9. A color measuring method comprising:
   capturing, with a sensor unit, a predetermined range including a subject;
   capturing, with the sensor unit, a reference chart composed of a plurality of colors together with a certain subject;
   illuminating, with an illumination light source, the subject and the reference chart;
   moving at least one lens of a lens member, the lens member including one or more lenses, the lens member arranged in an optical path of reflected light extending from the subject and the reference chart to the sensor unit, and the lens member is positioned between the reference chart and the sensor unit and between the subject and the sensor unit, so as to change a position of the at least one lens in a direction along the optical path; and
   calculating a colorimetric value of the subject based on image capturing data of the subject and the reference chart.

10. An image forming apparatus, comprising:
    the image capturing device according to claim 1; and
    an image forming unit that forms the subject.

11. The image capturing device according to claim 1, wherein
    the sensor unit captures image data of the subject and the reference chart at a same time,
    the lens member is positioned such that the subject and the reference chart maintain a stable positional relationship, and
    the image capturing device further comprises a processor that processes the image data of the subject according to the reference chart and the positional relationship between the subject and the reference chart.

* * * * *